US008713931B2

(12) United States Patent
Sakamoto et al.

(10) Patent No.: US 8,713,931 B2
(45) Date of Patent: May 6, 2014

(54) HYDRAULIC CIRCUIT FOR WORKING MACHINE

(75) Inventors: Kunihiko Sakamoto, Chikugo (JP); Riki Fujita, Chikugo (JP); Masaaki Yamashita, Chikugo (JP); Nagahiro Ogata, Chikugo (JP); Yousuke Yamashita, Chikugo (JP)

(73) Assignee: Yanmar Co., Ltd., Osaka (JP)

( * ) Notice: Subject to any disclaimer, the term of this patent is extended or adjusted under 35 U.S.C. 154(b) by 685 days.

(21) Appl. No.: 13/061,678

(22) PCT Filed: Aug. 5, 2009

(86) PCT No.: PCT/JP2009/063865
§ 371 (c)(1),
(2), (4) Date: Mar. 1, 2011

(87) PCT Pub. No.: WO2010/026848
PCT Pub. Date: Mar. 11, 2010

(65) Prior Publication Data

US 2011/0168283 A1 Jul. 14, 2011
US 2012/0048409 A9 Mar. 1, 2012

(30) Foreign Application Priority Data

Sep. 2, 2008 (JP) ................................ 2008-225257

(51) Int. Cl.
*F16D 31/02* (2006.01)

(52) U.S. Cl.
USPC ............................................ 60/486; 60/462

(58) Field of Classification Search
CPC .......... F15B 11/17; F15B 2211/20576; F04B 49/08; E02F 9/22
USPC .......... 60/420, 429, 427, 421, 462, 484, 486, 60/428
See application file for complete search history.

(56) References Cited

U.S. PATENT DOCUMENTS 5,083,428 A * 1/1992 Kubomoto et al. ............ 60/421
7,389,640 B2 * 6/2008 Muller et al. .................. 60/430
2009/0077958 A1 * 3/2009 Yamashita ..................... 60/444

FOREIGN PATENT DOCUMENTS

JP 62-178631 8/1987
JP 2005-121043 5/2005

(Continued)

OTHER PUBLICATIONS

International Search Report for International Application No. PCT/JP2009/063865, Japanese Patent Office, mailed Oct. 6, 2009, 4 pgs.

*Primary Examiner* — Edward Look
*Assistant Examiner* — Daniel Collins
(74) *Attorney, Agent, or Firm* — Sterne, Kessler, Goldstein & Fox P.L.L.C.

(57) ABSTRACT

A working vehicle, wherein flows of hydraulic oil delivered under pressure from two or more hydraulic pumps are joined together and the joined hydraulic oil can be taken out. A working vehicle is provided with two hydraulic pumps independent of each other and adapted to deliver hydraulic oil under pressure, a mode switching valve (230) capable of being switched to a flow joining position (K) at which flows of the hydraulic oil delivered under pressure by the two hydraulic pumps are joined together, PTO ports (260, 261) out of which the hydraulic oil is taken, and a PTO switching valve (240) provided downstream of the mode switching valve (230) and switching flow of the hydraulic oil so that the oil can be delivered under pressure to the PTO ports (260, 261).

10 Claims, 14 Drawing Sheets

(56) References Cited

FOREIGN PATENT DOCUMENTS

| | | |
|---|---|---|
| JP | 2005-351442 | 12/2005 |
| JP | 2006-083696 | 3/2006 |
| JP | 2006-249882 | 9/2006 |
| JP | 2006-329248 | 12/2006 |

* cited by examiner

HYDRAULIC CIRCUIT FOR WORKING MACHINE

TECHNICAL FIELD

The present invention relates to an art of a working vehicle having two or more hydraulic pumps.

BACKGROUND ART

Conventionally, an art of a working vehicle having two or more hydraulic pumps is well known (for example, see the Patent Literature 1).

A hydraulic circuit of the working vehicle has a loader control valve 500 shown in FIG. 14.

Pressure oil sent by one of the two hydraulic pumps (not shown) is supplied through a pipe 536 and a pump port 551 to the loader control valve 500. By switching a damping cylinder switching valve 510 and a bucket lifting cylinder switching valve 520, with the pressure oil sent by the one of the hydraulic pumps, the operation of two damping cylinders 518 and two bucket lifting cylinders 517 can be switched, in its turn operation of a loader (not shown) can be controlled.

By switching a power take off (PTO) switching valve 540, the pressure oil sent by the one of the hydraulic pumps can be extracted through PTO ports 560 and 561. Another working machine connected to the working vehicle can be driven with the extracted pressure oil.

Furthermore, pressure oil sent by the other hydraulic pump (not shown) is supplied through pipes 537 and 564 to a backhoe control valve (not shown) arranged at the downstream of the loader control valve 500. With the pressure oil supplied by the other hydraulic pump and the pressure oil pressingly sent by the one of the hydraulic pumps through the loader control valve 500, a carryover port 553 and a pipe 563 to the backhoe control valve, a backhoe (not shown) is driven.

Patent Literature 1: the Japanese Patent Laid Open Gazette 2006-249882

DISCLOSURE OF INVENTION

Problems to Be Solved by the Invention

However, it is disadvantageous that the pressure oil extracted through the PTO switching valve may be unable to drive a working machine requiring large flow rate. For example, in the case that the discharge amount of the pressure oil by the one of the hydraulic pumps is about 10 GPM (gallon/minute), a working machine requiring 17 GPM of pressure oil cannot be driven.

The present invention is provided in consideration of the above problems, and the purpose of the present invention is to provide a working vehicle in which pressure oil pressingly sent by two hydraulic pumps can be combined and extracted.

Means for Solving the Problems

The above problems are solved by the following means according to the present invention.

Namely, the present invention includes two or more hydraulic pumps independent of each other and pressingly sending pressure oil, a mode switching valve which can be switched to a confluence position at which the pressure oil pressingly sent by the two or more hydraulic pumps is combined, a PTO port at which the pressure oil is extracted, and a PTO switching valve arranged downstream the mode switching valve and switched so as to send pressingly the pressure oil to the PTO port.

According to the present invention, the mode switching valve is provided integrally in a control valve having the PTO switching valve.

According to the present invention, the mode switching valve can be switched among the confluence position, a return position at which the pressure oil pressingly sent by the two hydraulic pumps is returned to a tank, and a working position at which the pressure oil pressingly sent by the two hydraulic pumps is pressingly sent to the other control valves respectively arranged at the downstream sides without combining the pressure oil.

According to the present invention, the PTO switching valve has a continuous position at which pressure oil is held to be able to be sent pressingly to the PTO port, and an interlock mechanism which makes the mode switching valve able to be switched to the confluence position only in the case that the PTO switching valve is switched to the continuous position.

According to the present invention, the interlock mechanism is constructed so that, when the PTO switching valve is switched from the continuous position to the other position, the mode switching valve is switched from the confluence position to the other position.

According to the present invention, the interlock mechanism is constructed so that, in the middle of switching of the PTO switching valve from the continuous position to the other position, the mode switching valve is moved to a position across the position other than the confluence position for a predetermined dimension.

According to the present invention, a starting inhibition means is provided which inhibits starting of an engine in the case that the PTO switching valve is switched to the continuous position.

According to the present invention, an engine rotational speed restriction means is provided which restricts the rotational speed of the engine not more than a predetermined rotational speed in the case that the mode switching valve is switched to the confluence position.

Effect of the Invention

The present invention constructed as the above brings the following effects.

According to the present invention, the pressure oil pressingly sent by the hydraulic pumps independent of each other can be combined and the combined pressure oil can be extracted through the PTO port. Accordingly, a working machine requiring large flow rate can be driven.

According to the present invention, any space is not required for arranging the mode switching valve, whereby the space can be saved. Simultaneously, any piping connecting the mode switching valve to the control valve is not required, whereby the part number and cost can be reduced.

According to the present invention, by switching the mode switching valve to the return position, the pressure oil can be returned to the tank with the short route. Accordingly, pressure loss caused by the pipes and the like in the hydraulic circuit can be reduced. Since the confluence position, the return position and the working position are provided in the same valve, it is not necessary to secure separately a space in which the valve is arranged, whereby the space is saved. Furthermore, by providing the positions in the same valve, the part number and cost can be reduced.

According to the present invention, the pressure oil pressingly sent by the two or more hydraulic pumps can be combined only in the case that the pressure oil is extracted from the PTO port regularly (continuously). Accordingly, the combined pressure oil is prevented from being pressingly sent from the port other than the PTO port so as to cause error of a working machine at the downstream side because of the large flow rate, thereby improving the safety of the working vehicle.

According to the present invention, the pressure oil pressingly sent by the two or more hydraulic pumps can be combined only in the case that the pressure oil is extracted from the PTO port regularly (continuously). Only by switching the PTO switching valve from the continuous position, the combining of the pressure oil can be stopped.

According to the present invention, the mode switching valve can be switched certainly to the position other than the confluence position.

According to the present invention, the working machine connected to the PTO port is prevented from being driven simultaneously to the starting of the engine. Accordingly, the safety of the working machine can be improved.

According to the present invention, in the case of combining the pressure oil pressingly sent by the two or more hydraulic pumps, the rising of temperature of the combined pressure oil K can be suppressed. Accordingly, extraordinariness such as overheating can be prevented.

DESCRIPTION OF NOTATIONS

Figure 1:
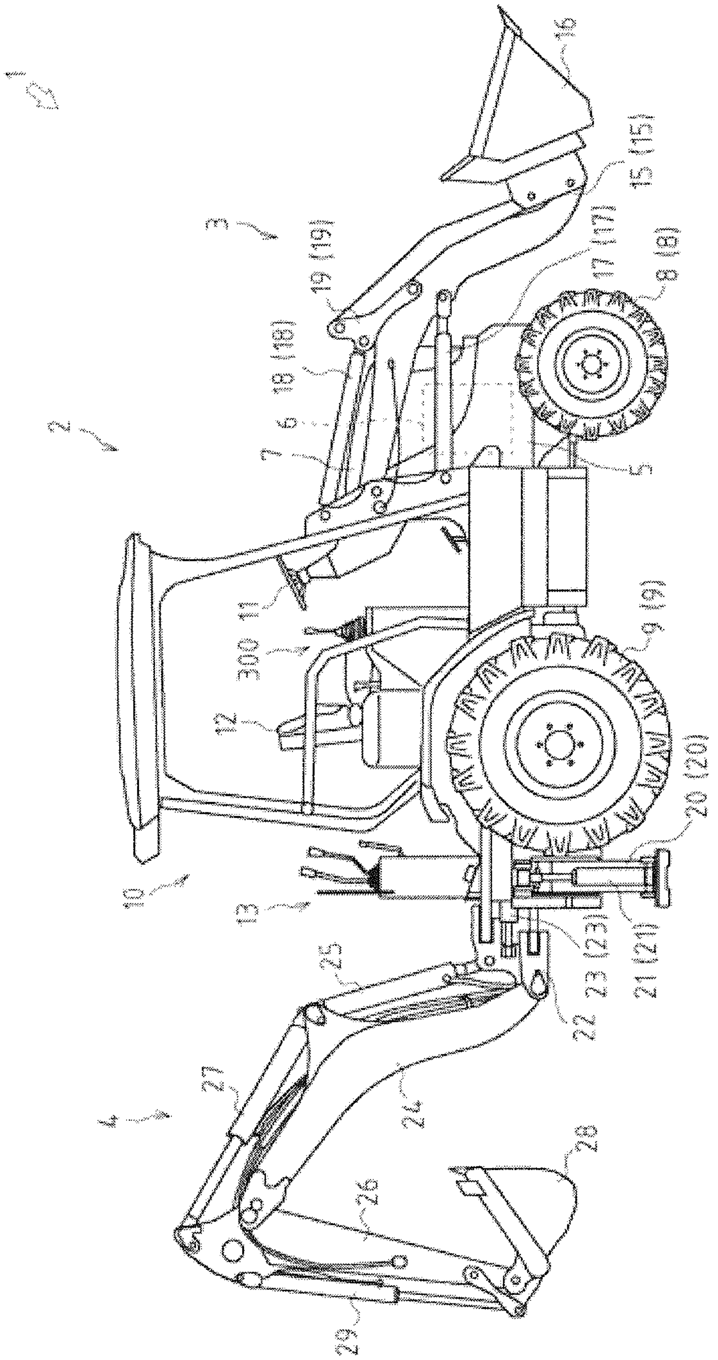
[FIG. 1] It is a right side view of entire construction of a working vehicle according to an embodiment of the present invention.

1 working vehicle
6 engine
3 loader
4 backhoe
120 reservoir tank
150 backhoe control valve
200 loader control valve
230 mode switching valve
240 PTO switching valve
260 PTO port
261 PTO port
344 cam part
364 cam part
380 limit switch
400 interlock mechanism
450 throttle lever restriction mechanism

THE BEST MODE FOR CARRYING OUT THE INVENTION

Next, explanation will be given on a working vehicle 1 which is an embodiment according to the present invention.

As shown in FIG. 1, the working vehicle 1 performs conveyance work and excavation work of earth and sand and the like with a working device. The working vehicle 1 mainly has a traveling vehicle 2, a loader 3 and a backhoe 4.

The traveling vehicle 2 is a main body of the working vehicle 1. The traveling vehicle 2 mainly has a body frame 5, an engine 6, a bonnet 7, two front wheels 8, two rear wheels 9 and an operation part 10.

The body frame 5 is a main structure of the traveling vehicle 2. The body frame 5 is a substantially box-like member formed from a plurality of plate members while the lengthwise direction thereof is in agreement with the longitudinal direction.

The engine 6 generates power for driving the working vehicle 1. The engine 6 is provided in the front portion of the body frame 5.

The bonnet 7 covers apparatuses such as the engine 6 provided in the traveling vehicle 2. The bonnet 7 is provided in the front portion of the body frame 5. The bonnet 7 is constructed so as to cover the apparatuses such as the engine 6 provided in the front portion of the body frame 5.

The front wheels 8 support the body frame 5. The front wheels 8 are provided respectively at the left and right of the lower front portion of the body frame 5. The front wheels 8 are rotated by the power generated by the engine 6.

The rear wheels 9 support the body frame 5. The rear wheels 9 are provided respectively at the left and right of the lower rear portion of the body frame 5. The rear wheels 9 are rotated by the power generated by the engine 6.

The operation part 10 is a position in which an operator operates the working vehicle 1. The operation part 10 is provided at the substantially longitudinal center of the body frame 5. The operation part 10 mainly has a steering wheel 11, a seat 12, a loader operation device 300 and a backhoe operation device 13.

The steering wheel 11 is a member for steering the front wheels 8. The steering wheel 11 is provided in the front portion of the operation part 10.

The seat 12 is a member on which an operator sits. The seat 12 is provided behind the steering wheel 11.

The loader operation device 300 operates the working device such as the loader 3 and sets the engine rotational speed of the working vehicle 1 and the like. The loader operation device 300 is provided at the side (in this embodiment, the right side) of the seat 12.

The backhoe operation device 13 operates the backhoe 4 and the like. The backhoe operation device 13 is provided behind the seat 12.

The loader 3 is a working device for conveying earth and sand. The loader 3 mainly has two bucket lift arms 15, a loader bucket 16, two bucket lift cylinders 17 and two dump cylinders 18.

The bucket lift arms 15 are a main structure of the loader 3. The rear ends of the bucket lift arms 15 are respectively supported rotatably on the left and right portions of the body frame 5.

The loader bucket 16 is a member loaded with the earth and sand. The loader bucket 16 is rotatably vertically supported at the front ends of the bucket lift arms 15.

The bucket lift cylinders 17 are hydraulic cylinders which can be controlled to expand and contract by the loader operation device 300. The rear ends of the bucket lift cylinders 17 are respectively supported rotatably vertically on the left and right portions of the body frame 5. The front ends of the bucket lift cylinders 17 are respectively supported rotatably vertically on the middle portions of the bucket lift arms 15.

The dump cylinders 18 are hydraulic cylinders which can be controlled to expand and contract by the loader operation device 300. The rear ends of the dump cylinders 18 are respectively supported rotatably vertically on the left and right portions of the body frame 5. The front ends of the dump cylinders 18 are connected respectively through two link mechanisms 19 to the loader bucket 16.

In the loader 3 constructed as mentioned above, by expanding and contracting the bucket lift cylinders 17, the bucket lift arms 15 can be moved vertically. By expanding and contracting the dump cylinders 18, the loader bucket 16 can be rotated vertically about the bucket lift arms 15.

By combining the rotational actions of the bucket lift arms 15 and the loader bucket 16, the working vehicle 1 performs conveyance work of earth and sand.

The backhoe 4 performs excavation work of earth and sand. The backhoe 4 mainly has two stabilizers 20, two stabilizer cylinders 21, a boom bracket 22, two swing cylinders 23, a boom 24, a boom cylinder 25, an arm 26, an arm cylinder 27, a bucket 28 and a bucket cylinder 29.

The stabilizers 20 support the working vehicle 1 at the time of the excavation work with the backhoe 4. One of ends of each of the stabilizers 20 is supported rotatably vertically at corresponding one of the left and right sides of the rear portion of the body frame 5.

The stabilizer cylinders 21 are hydraulic cylinders which can be controlled to expand and contract by the backhoe operation device 13. One of ends of each of the stabilizer cylinders 21 is supported rotatably vertically at corresponding one of the left and right sides of the rear portion of the body frame 5. The other end of each of the stabilizer cylinders 21 is supported by the other end of corresponding one of the stabilizers 20.

The boom bracket 22 is a main structure of the backhoe 4. The front end of the boom bracket 22 is supported rotatably laterally at the rear end of the body frame 5.

The swing cylinders 23 are hydraulic cylinders which can be controlled to expand and contract by the backhoe operation device 13. The swing cylinders 23 are provided respectively at the left and right sides of the body frame 5 and the boom bracket 22. One of ends of each of the swing cylinders 23 is supported rotatably laterally at the rear end of the body frame 5. The other end of each of the swing cylinders 23 is supported rotatably laterally at the front end of the boom bracket 22.

The boom 24 is a main structure of the backhoe 4. One of ends of the boom 24 is supported rotatably vertically at the rear end of the boom bracket 22.

The boom cylinder 25 is a hydraulic cylinder which can be controlled to expand and contract by the backhoe operation device 13. One of ends of the boom cylinder 25 is supported rotatably vertically on upper portion of the rear end of the boom bracket 22. The other end of the boom cylinder 25 is supported rotatably vertically on the middle portion of the boom 24.

The arm 26 is a main structure of the backhoe 4. One of ends of the arm 26 is supported rotatably vertically at the other end of the boom 24.

The arm cylinder 27 is a hydraulic cylinder which can be controlled to expand and contract by the backhoe operation device 13. One of ends of the arm cylinder 27 is supported rotatably vertically on the middle portion of the boom 24. The other end of the arm cylinder 27 is supported rotatably vertically at one of ends of the arm 26.

The bucket 28 is a member loaded with the earth and sand. One of ends of the bucket 28 is supported rotatably vertically at the other end of the arm 26.

The bucket cylinder 29 is a hydraulic cylinder which can be controlled to expand and contract by the backhoe operation device 13. One of ends of the bucket cylinder 29 is supported rotatably vertically at the middle portion of the arm 26. The other end of the bucket cylinder 29 is supported rotatably vertically at the bucket 28.

In the backhoe 4 constructed as mentioned above, by expanding and contracting the stabilizer cylinders 21, the other end of each of the stabilizers 20 can touch the ground. Accordingly, the posture of the working vehicle 1 at the excavation work can be stabilized.

By expanding and contracting the swing cylinders 23, the boom bracket 22 can be rotated laterally. By expanding and contracting the boom cylinder 25, the boom 24 can be rotated vertically. By expanding and contracting the arm cylinder 27, the arm 26 can be rotated vertically about the boom 24. By expanding and contracting the bucket cylinder 29, the bucket 28 can be rotated vertically about the arm 26. By combining the rotational action of the boom bracket 22, the boom 24, the arm 26 and the bucket 28, the working vehicle 1 performs the excavation work of earth and sand.

Explanation will be given on entire construction of a hydraulic circuit 100 which is an embodiment of a hydraulic circuit provided in the working vehicle according to the present invention referring to FIG. 2.

The hydraulic circuit 100 is provided in the working vehicle 1. The hydraulic circuit 100 mainly has a hydrostatic transmission (HST) section 110, a reservoir tank 120, a hydraulic pump section 130, a power steering valve section 140, a loader control valve 200 and a backhoe control valve 150.

The HST section 110 changes the working vehicle 1 in speed with the power of the engine 6.

The reservoir tank 120 is an embodiment of a tank according to the present invention and is a container in which pressure oil used in the hydraulic circuit 100 is reserved. A transmission casing provided in the working vehicle 1 may serve as the reservoir tank 120.

The hydraulic pump section 130 pressingly sends pressure oil with the power of the engine 6. The hydraulic pump section 130 has a port 131 which is an opening through which pipes are connected. The hydraulic pump section 130 has discharge ports 132, 133 and 134 through which pressure oil is discharged respectively by independent hydraulic pumps.

A pipe 121 connects the reservoir tank 120 to the port 131 of the hydraulic pump section 130. The hydraulic pump section 130 sucks pressure oil in the reservoir tank 120 through the pipe 121 and the port 131 and discharge the pressure oil through the discharge ports 132, 133 and 134.

The power steering valve section 140 controls action of a steering cylinder 141 which controls the steering of the front wheels 8. The power steering valve section 140 controls expand and contract of the steering cylinder 141 corresponding to the operation of the steering wheel 11. The power steering valve section 140 has a port 142 which is an opening through which pipes are connected and the like.

A pipe 135 connects the discharge port 134 of the hydraulic pump section 130 to the port 142 of the power steering valve section 140. The power steering valve section 140 controls the action of the steering cylinder 141 with the pressure oil supplied through the discharge port 134 and the pipe 135.

The loader control valve 200 controls the action of the bucket lift cylinders 17 and the dump cylinders 18. The loader control valve 200 has a pump port 251, a tank port 252, a carry-over port 253, dump cylinder ports 254 and 255, bucket lift cylinder ports 256 and 257, ports 258 and 259, PTO ports 260 and 261, and the like which are openings through which pipes are connected.

A pipe 136 connects the discharge port 133 of the hydraulic pump section 130 to the pump port 251 of the loader control valve 200.

A pipe 137 connects the discharge port 132 of the hydraulic pump section 130 to the port 258 of the loader control valve 200.

A pipe 262 connects the tank port 252 of the loader control valve 200 to the reservoir tank 120.

The backhoe control valve 150 controls the action of the stabilizer cylinders 21, the swing cylinders 23, the boom cylinder 25, the arm cylinder 27 and the bucket cylinder 29. The backhoe control valve 150 has ports 151 and 152 and the like which are openings through which pipes are connected.

A pipe 263 connects the carry-over port 253 of the loader control valve 200 to the port 151 of the backhoe control valve 150.

A pipe 264 connects the port 259 of the loader control valve 200 to the port 152 of the backhoe control valve 150.

The backhoe control valve 150 controls the action of the stabilizer cylinders 21, the swing cylinders 23 and the arm cylinder 27 with the pressure oil supplied through the pipe 263 and the port 151.

The backhoe control valve 150 controls the action of the stabilizer cylinders 21, the bucket cylinder 29 and the boom cylinder 25 with the pressure oil supplied through the pipe 264 and the port 152.

In this embodiment, in the working vehicle 1, the backhoe control valve 150 is provided at the downstream of the loader control valve 200. However, the present invention is not limited thereto. Instead of the backhoe control valve 150, a control valve or the like may alternatively be provided so as to switch the action of the lift cylinder which moves vertically the mounted working machine. It may alternatively be constructed that any control valve or the like is not provided.

Figure 3:
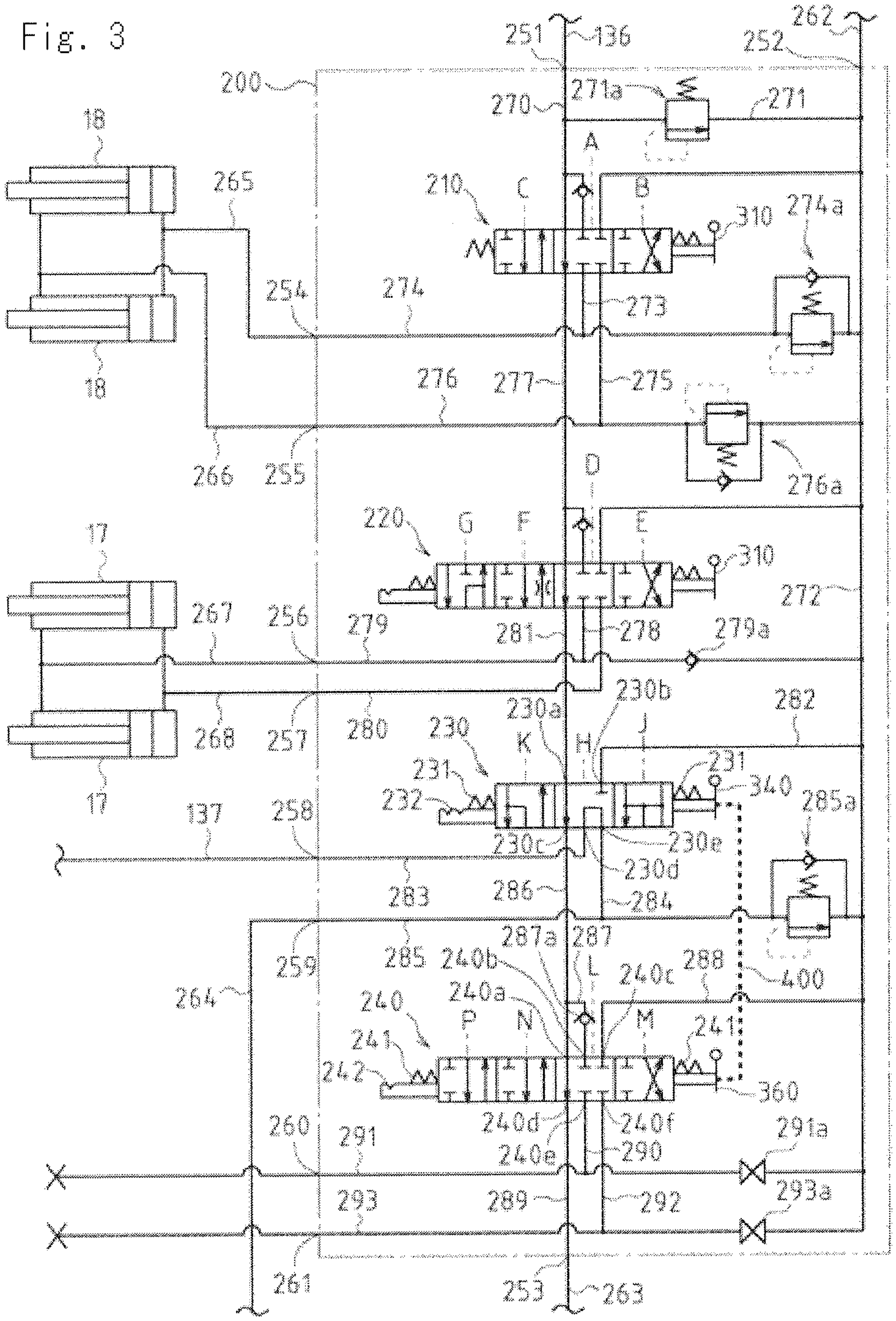
[FIG. 3] It is a partially enlarged drawing of the hydraulic circuit.

Explanation will be given on the construction of the loader control valve 200 in detail referring to FIG. 3.

The loader control valve 200 mainly has a dump cylinder switching valve 210, a bucket lift cylinder switching valve 220, a mode switching valve 230 and a PTO switching valve 240.

The dump cylinder switching valve 210 is arranged between the pump port 251 and the dump cylinders 18 and switches the flow route of pressure oil pressingly sent to the dump cylinders 18 so as to switch the action of the dump cylinders 18. The dump cylinder switching valve 210 has six ports and three positions (positions A, B and C). The position of the dump cylinder switching valve 210 can be switched by operating a loader operation lever 310 provided in the loader operation device 300.

An oil passage 270 connects the pump port 251 to the dump cylinder switching valve 210.

An oil passage 271 connects the oil passage 270 to an oil passage 272. A release valve 271 a is provided at the middle portion of the oil passage 271.

The oil passage 272 is connected to the tank port 252.

An oil passage 273 connects the dump cylinder switching valve 210 to a middle portion of an oil passage 274.

The oil passage 274 connects the dump cylinder port 254 to the oil passage 272. An anti-void release valve 274*a* is provided at the middle portion of the oil passage 274 in the vicinity of the connection part of the oil passage 274 and the oil passage 272.

An oil passage 275 connects the dump cylinder switching valve 210 to a middle portion of an oil passage 276.

An oil passage 276 connects the dump cylinder port 255 to the oil passage 272. An anti-void release valve 276*a* is provided at the middle portion of the oil passage 276 in the vicinity of the connection part of the oil passage 276 and the oil passage 272.

A pipe 265 connects the dump cylinder port 254 to bottom chambers of the dump cylinders 18.

A pipe 266 connects the dump cylinder port 255 to rod chambers of the dump cylinders 18.

The pressure oil discharged from the discharge port 133 (see FIG. 2) is pressingly sent through the pipe 136, the pump port 251 and the oil passage 270 to the dump cylinder switching valve 210.

By switching the dump cylinder switching valve 210 to the position C, the pressure oil is pressingly sent through the oil passage 273, the oil passage 274, the dump cylinder port 254 and the pipe 265 to the bottom chambers of the dump cylinders 18. Accordingly, the dump cylinders 18 can be expanded.

By switching the dump cylinder switching valve 210 to the position B, the pressure oil is pressingly sent through the oil passage 275, the oil passage 276, the dump cylinder port 255 and the pipe 266 to the rod chambers of the dump cylinders 18. Accordingly, the dump cylinders 18 can be contracted.

Therefore, by switching the position of the dump cylinder switching valve 210, the dump cylinders 18 can be expanded and contracted. Accordingly, the loader bucket 16 can be rotated vertically about the bucket lift arms 15.

The bucket lift cylinder switching valve 220 is arranged between the dump cylinder switching valve 210 and the bucket lift cylinders 17 and switches the flow route of pressure oil pressingly sent to the bucket lift cylinders 17 so as to switch the action of the bucket lift cylinders 17. The bucket lift cylinder switching valve 220 has six ports and four positions (positions D, E, F and G). The position of the bucket lift cylinder switching valve 220 can be switched by operating the loader operation lever 310 provided in the loader operation device 300.

An oil passage 277 connects the dump cylinder switching valve 210 to the bucket lift cylinder switching valve 220.

An oil passage 278 connects the bucket lift cylinder switching valve 220 to a middle portion of an oil passage 279.

The oil passage 279 connects the bucket lift cylinder port 256 to the oil passage 272. A check valve 279*a* is provided at the middle portion of the oil passage 279 in the vicinity of the connection part of the oil passage 279 and the oil passage 272.

An oil passage 280 connects the bucket lift cylinder switching valve 220 to the bucket lift cylinder port 257.

A pipe 267 connects the bucket lift cylinder port 256 to rod chambers of the bucket lift cylinders 17.

A pipe 268 connects the bucket lift cylinder port 257 to bottom chambers of the bucket lift cylinders 17.

When the dump cylinder switching valve 210 is switched to the position A, the pressure oil passing through the dump cylinder switching valve 210 is pressingly sent through the oil passage 277 to the bucket lift cylinder switching valve 220.

By switching the bucket lift cylinder switching valve 220 to the position E, the pressure oil is pressingly sent through the oil passage 280, the bucket lift cylinder port 257 and the pipe 268 to the bottom chambers of the bucket lift cylinders 17. Accordingly, the bottom chambers of the bucket lift cylinders 17 can be expanded.

By switching the bucket lift cylinder switching valve 220 to the position F, the pressure oil is pressingly sent through the oil passage 278, the oil passage 279, the bucket lift cylinder port 256 and the pipe 267 to the rod chambers of the bucket lift cylinders 17. Accordingly, the bucket lift cylinders 17 can be contracted.

Therefore, by switching the bucket lift cylinder switching valve 220, the bucket lift cylinders 17 can be expanded and contracted. Accordingly, the bucket lift arms 15 can be moved vertically.

The mode switching valve 230 is arranged between the bucket lift cylinder switching valve 220 and the carry-over port 253 and switches the flow route of pressure oil. The mode switching valve 230 is a directional control valve having five ports, i.e. ports 230*a* and 230*b* of the primary side and ports 230*c*, 230*d* and 230*e* of the secondary side, and three positions.

The mode switching valve 230 can be switched among a "working position H" in which the port 230*a* is communicated with the port 230*c*, the port 230*d* is communicated with the port 230*e*, and the port 230*b* is blocked, a "return position J" in which the port 230*a*, the port 230*b*, the port 230*c*, the port 230*d* and the port 230*e* are communicated with each other, and a "confluence position K" in which the port 230*a* is communicated with the port 230*c* and the port 230*d* and the port 230*b* is communicated with the port 230*e*.

The position of the mode switching valve 230 can be switched by operating a mode switching lever 340 provided in the loader operation device 300.

The mode switching valve 230 has two springs 231 and a detent mechanism 232.

The springs 231 hold the position of the mode switching valve 230 at the working position H. Though the mode switching valve 230 has the springs 231 in this embodiment, the present invention is not limited thereto. It may alternatively be constructed that the mode switching valve 230 does not have the springs 231.

The detent mechanism 232 holds the position of the mode switching valve 230 at the return position J or the confluence position K. When the mode switching valve 230 is switched to the return position J or the confluence position K, the detent mechanism 232 holds the position of the mode switching valve 230 at corresponding one of the return position J and the confluence position K. By operating the mode switching lever 340 with operation force larger than the holding force of the detent mechanism 232, the mode switching valve 230 can be switched to the other position.

An oil passage 281 connects the bucket lift cylinder switching valve 220 to the port 230*a* of the mode switching valve 230.

An oil passage 282 connects the port 230*b* of the mode switching valve 230 to the oil passage 272 (in its turn the reservoir tank 120).

An oil passage 283 connects the port 230*d* of the mode switching valve 230 to the port 258 (in its turn the discharge port 132 of the hydraulic pump).

An oil passage 284 connects the port 230*e* of the mode switching valve 230 to a middle portion of an oil passage 285 (in its turn the port 152 of the backhoe control valve 150).

The oil passage 285 connects the oil passage 272 to the port 259. An anti-void release valve 285*a* is provided at the middle portion of the oil passage 285 in the vicinity of the connection part of the oil passage 285 and the oil passage 272.

The PTO switching valve 240 is arranged between the mode switching valve 230 and the carry-over port 253 and switches the flow route of pressure oil sent to the PTO ports 260 and 261. The PTO switching valve 240 is a directional control valve having six ports, i.e. ports 240*a*, 240*b* and 240*c* of the primary side and ports 240*d*, 240*e* and 240*f* of the secondary side, and four positions.

The PTO switching valve 240 can be switched among a "position L" in which the port 240*a* is communicated with the port 240*d* and the ports 240*b*, 240*c*, 240*e* and 240*f* are blocked, a "position M" in which the port 240*b* is communicated with the port 240*f*, the port 240*c* is communicated with the port 240*e* and the ports 240*a* and 240*d* are blocked, a "position N" in which the port 240*b* is communicated with the port 240*e*, the port 240*c* is communicated with the port 240*f* and the ports 240*a* and 240*d* are blocked, and a "continuous position P" in which the port 240*b* is communicated with the port 240*e*, the port 240*c* is communicated with the port 240*f* and the ports 240*a* and 240*d* are blocked.

The PTO switching valve 240 can be switched by operating a PTO switching lever 360 provided in the loader operation device 300.

The PTO switching valve 240 has two springs 241 and a detent mechanism 242.

The springs 241 hold the position of the PTO switching valve 240 at the position L.

The detent mechanism 242 holds the position of the PTO switching valve 240 at the continuous position P. When the PTO switching valve 240 is switched to the continuous position P, the detent mechanism 242 holds the position of the PTO switching valve 240 at the continuous position P. By operating the PTO switching lever 360 with operation force larger than the holding force of the detent mechanism 242, the PTO switching valve 240 can be switched to the other position.

An oil passage 286 connects the port 230*c* of the mode switching valve 230 to the port 240*a* of the PTO switching valve 240.

An oil passage 287 connects the middle portion of the oil passage 286 to the port 240*b* of the PTO switching valve 240. A check valve 287*a* is provided at the middle portion of the oil passage 287.

An oil passage 288 connects the port 240*c* of the PTO switching valve 240 to the oil passage 272.

An oil passage 289 connects the port 240*d* of the PTO switching valve 240 to the carry-over port 253.

An oil passage 290 connects the port 240*e* of the PTO switching valve 240 to an oil passage 291.

The oil passage 291 connects the PTO port 260 to the oil passage 272. A plug 291*a* is provided at the middle portion of the oil passage 291 in the vicinity of the connection part of the oil passage 291 and the oil passage 272. If necessary, instead of the plug 291*a*, a release valve or the like may alternatively be interposed.

An oil passage 292 connects the port 240*f* of the PTO switching valve 240 to a middle portion of an oil passage 293.

The oil passage 293 connects the PTO port 261 to the oil passage 272. A plug 293*a* is provided at the middle portion of the oil passage 293 in the vicinity of the connection part of the oil passage 293 and the oil passage 272. If necessary, instead of the plug 293*a*, a release valve or the like may alternatively be interposed.

The mode switching lever 340 and the PTO switching lever 360 have an interlock mechanism 400. The interlock mechanism 400 restricts the action of the mode switching lever 340 (in its turn, the action of the mode switching valve 230) based on the position of the PTO switching lever 360 (in its turn, the position of the PTO switching valve 240). More concretely, the interlock mechanism 400 restricts the action of the mode switching lever 340 so that the mode switching valve 230 can be switched to the confluence position K only in the case that the PTO switching valve 240 is at the continuous position P.

Explanation will be given on the switching of the flow route of pressure oil with the mode switching valve 230 and the PTO switching valve 240 constructed as mentioned above.

When the excavation work or the like is performed with the backhoe 4, the mode switching valve 230 is switched to the working position H. In this case, the PTO switching valve 240 is not operated, whereby the PTO switching valve 240 is held at the position L by the springs 241.

Figure 2:
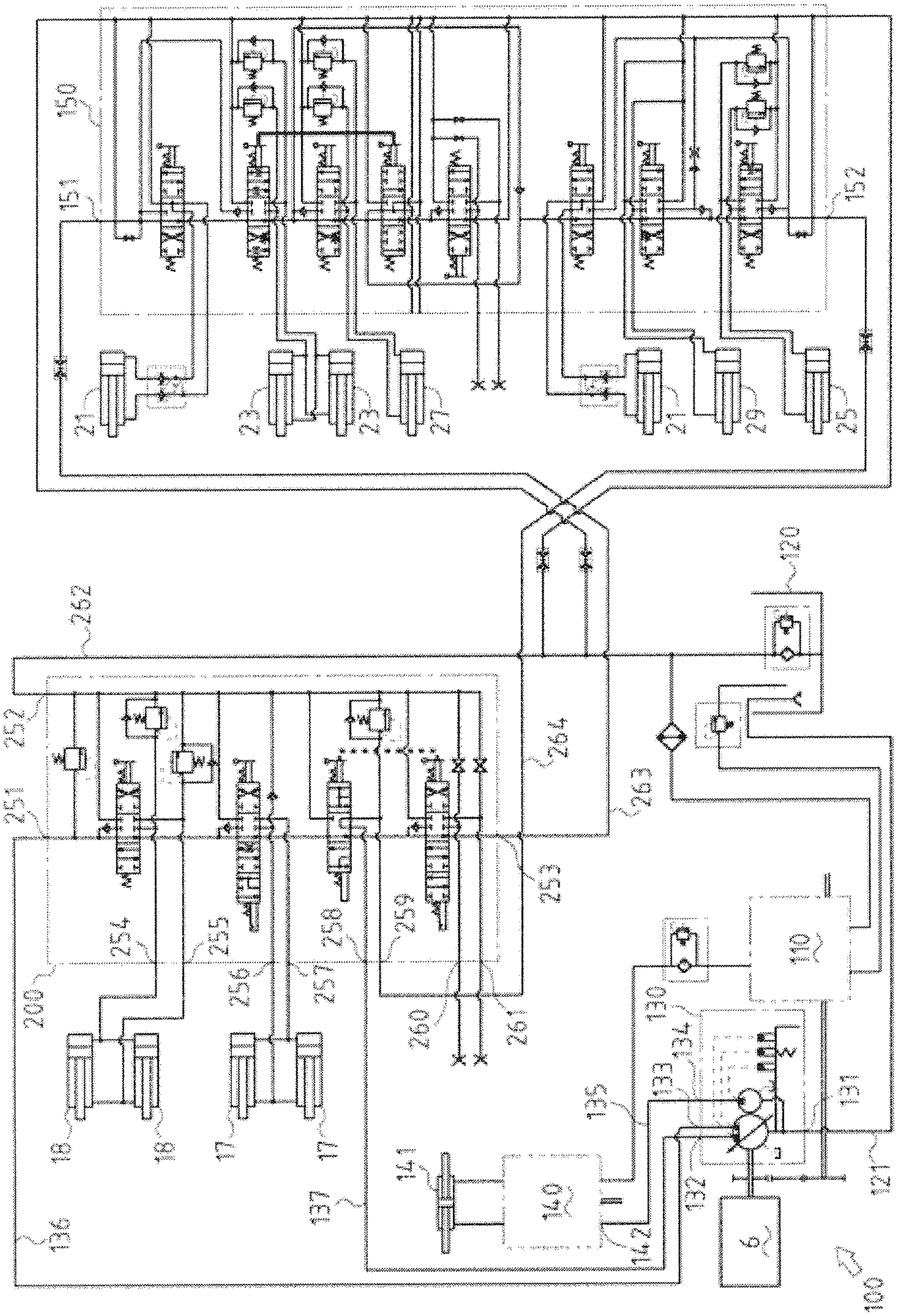
[FIG. 2] It is an entire schematic drawing of a hydraulic circuit provided in the working vehicle.

In this case, the pressure oil discharged from the discharge port 133 (see FIG. 2) is pressingly sent through the pipe 136, the pump port 251, the oil passage 270, the dump cylinder switching valve 210, the oil passage 277, the bucket lift cylinder switching valve 220, the oil passage 281, the mode switching valve 230, the oil passage 286, the PTO switching valve 240, the oil passage 289, the carry-over port 253 and the pipe 263 to the backhoe control valve 150 (see FIG. 2).

The pressure oil discharged from the discharge port 132 (see FIG. 2) is pressingly sent through the pipe 137, the port 258, the oil passage 283, the mode switching valve 230, the oil passage 284, the oil passage 285, the port 259 and the pipe 264 to the backhoe control valve 150 (see FIG. 2).

As mentioned above, the pressure oil discharged from the discharge ports 132 and 133 are pressingly sent to the backhoe control valve 150. The backhoe 4 is driven with the pressure oil pressingly sent.

In the case that a working machine is connected to the PTO ports 260 and 261 and is used for work, the mode switching valve 230 is switched to the working position H.

In this case, the pressure oil discharged from the discharge port 133 (see FIG. 2) is pressingly sent through the pipe 136, the pump port 251, the oil passage 270, the dump cylinder switching valve 210, the oil passage 277, the bucket lift cylinder switching valve 220, the oil passage 281, the mode switching valve 230, and the oil passages 286 and 287 to the PTO switching valve 240. By operating the PTO switching lever 360 so as to switch the PTO switching valve 240 to the position M or N, the pressure oil pressingly sent can be extracted through the PTO port 260 or the PTO port 261. The working machine is driven with the extracted pressure oil.

In the case of conveying work of earth and sand with the loader 3 or in the case of traveling, the mode switching valve 230 is switched to the return position J.

In this case, the pressure oil discharged from the discharge port 133 (see FIG. 2) is pressingly sent through the pipe 136, the pump port 251 and the oil passage 270 to the dump cylinder switching valve 210. By operating the dump cylinder switching valve 210 and the bucket lift cylinder switching valve 220, the loader 3 is operated with the pressure oil pressingly sent. The pressure oil discharged from the discharge port 133 and passing through the dump cylinder switching valve 210 and the bucket lift cylinder switching valve 220 is pressingly sent through the oil passage 281 to the mode switching valve 230.

The pressure oil discharged from the discharge port 132 (see FIG. 2) is pressingly sent through the pipe 137, the port 258 and the oil passage 283 to the mode switching valve 230.

The pressure oil discharged from the discharge ports 132 and 133 and pressingly sent to the mode switching valve 230 is returned through the oil passage 282, the oil passage 272, the tank port 252 and the pipe 262 to the reservoir tank 120 (see FIG. 2).

As mentioned above, by switching the mode switching valve 230 to the return position J, the pressure oil discharged from the discharge port 132 can be returned to the reservoir tank 120 through the short route. Accordingly, in the case that any work is not performed with the backhoe 4, pressure loss caused by the pipes can be reduced, whereby the engine power can be used effectively.

At the time of starting the engine 6, by switching the mode switching valve 230 to the return position J, pressure loss caused by the pipes can be reduced, whereby the starting ability of the engine 6 can be improved. Accordingly, at the operation environment with external air of low temperature, good starting ability of the engine 6 can be obtained.

In the case that a working machine requiring larger flow rate than the flow rate of pressure oil discharged from the discharge port 133 is connected to the PTO ports 260 and 261 and work is performed by the working machine, firstly, the PTO switching valve 240 is switched to the continuous position P. Then, the restriction of action of the mode switching valve 230 by the interlock mechanism 400 is released. Subsequently, the mode switching valve 230 is switched to the confluence position K.

In this case, the pressure oil discharged from the discharge port 133 (see FIG. 2) is pressingly sent through the pipe 136, the pump port 251, the oil passage 270, the dump cylinder switching valve 210, the oil passage 277, the bucket lift cylinder switching valve 220, and the oil passage 281 to the mode switching valve 230.

The pressure oil discharged from the discharge port 132 (see FIG. 2) is pressingly sent through the pipe 137, the port 258 and the oil passage 283 to the mode switching valve 230.

The pressure oil discharged from the discharge ports 132 and 133 and pressingly sent to the mode switching valve 230 is combined in the mode switching valve 230. The combined pressure oil is pressingly sent through the oil passages 286 and 287, the interlock mechanism 400, the oil passage 290, the oil passage 291 and the PTO port 260 to the connected working machine.

As mentioned above, the working vehicle 1 in this embodiment comprises the two hydraulic pumps pressingly sending pressure oil and independent of each other, the mode switching valve 230 which can be switched to the confluence position K at which the pressure oil pressingly sent by the two hydraulic pumps is combined, the PTO ports 260 and 261 at which the pressure oil is extracted, and the PTO switching valve 240 arranged downstream the mode switching valve 230 and switched so as to send pressingly the pressure oil to the PTO ports 260 and 261, In this construction, by switching the mode switching valve 230 to the confluence position K, the pressure oil discharged from the discharge ports 132 and 133 can be combined. By employing the combined pressure oil, a working machine which requires too large flow rate to be driven by the pressure oil discharged from one of the discharge ports 132 and 133 can be driven. Accordingly, a working machine requiring large flow rate such as a skid steer can be driven on the working vehicle 1.

The mode switching valve 230 is provided integrally in the loader control valve 200 having the PTO switching valve 240.

According to this construction, it is not necessary to secure separately a space in which the mode switching valve 230 is arranged, whereby the space is saved. Furthermore, any pipe connecting the mode switching valve 230 to the loader control valve 200 is not required, whereby the part number and cost are reduced.

The present invention is not limited to this construction, and the mode switching valve 230 may alternatively be constructed independently of the loader control valve 200.

Figure 14:
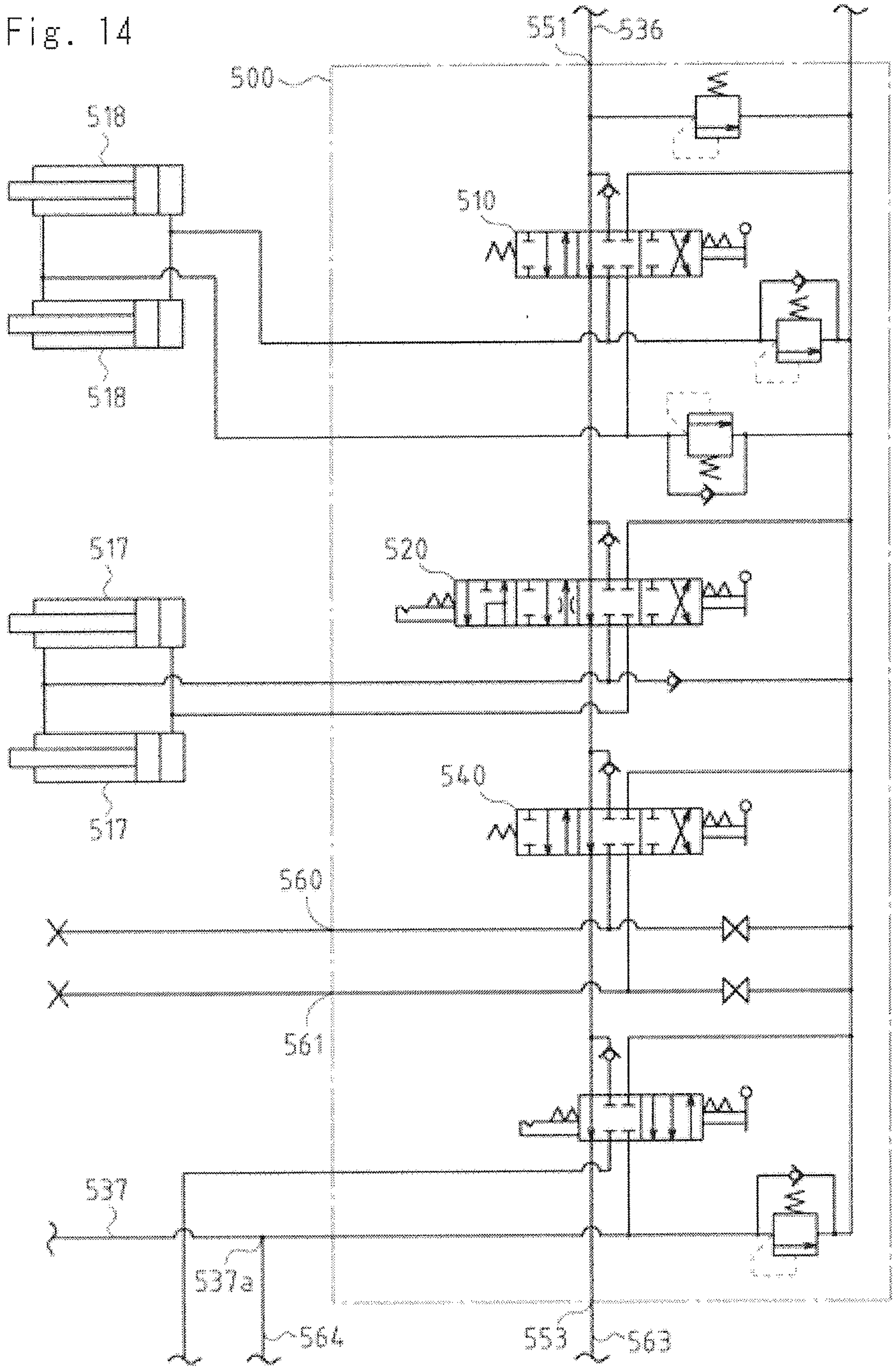
[FIG. 14] It is a drawing of a conventional hydraulic circuit.

By employing the loader control valve constructed as this embodiment, the piping construction of the hydraulic circuit 100 provided in the working vehicle 1 can be simplified. Concretely, a three way joint required at a connection part 537*a* between a pipe 537 and a pipe 564 shown in FIG. 14 can be made unnecessary. Accordingly, the piping construction of the hydraulic circuit 100 can be simplified so as to reduce the part number and reduce the number of assembly processes.

The mode switching valve 230 can be switched among the confluence position K, the return position J at which the pressure oil pressingly sent by the two hydraulic pumps is returned to the reservoir tank 120, and the working position H at which the pressure oil pressingly sent by the two hydraulic pumps is pressingly sent to the backhoe control valve 150 arranged at the downstream side without combining the pressure oil.

According to this construction, by switching the mode switching valve 230 to the return position J, the pressure oil can be returned to the reservoir tank 120 with the short route. Accordingly, pressure loss caused by the pipes and the like in the hydraulic circuit 100 can be reduced. Since the confluence position K, the return position J and the working position H are provided in the same valve, it is not necessary to secure separately a space in which the valve is arranged, whereby the space is saved. Furthermore, by providing the positions in the same valve, the part number and cost can be reduced.

The PTO switching valve 240 has the continuous position P at which pressure oil is held to be able to be sent pressingly to the PTO ports 260 and 261, and the interlock mechanism 400 which makes the mode switching valve 230 able to be switched to the confluence position K only in the case that the PTO switching valve 240 is switched to the continuous position P.

According to this construction, the safety of the working vehicle 1 can be improved.

Concretely, in the case that the PTO switching valve 240 is at the position L, when the mode switching valve 230 is switched to the confluence position K, the pressure oil combined in the mode switching valve 230 is pressingly sent through the oil passage 286, the PTO switching valve 240, the oil passage 289, the carry-over port 253, the pipe 263 and the port 151 to the backhoe control valve 150. On the other hand, any pressure oil is not supplied from the port 152 to the backhoe control valve 150.

In this case, the stabilizer cylinders 21, the swing cylinders 23 and the arm cylinder 27 shown in FIG. 2 are operated at high speed by the pressure oil supplied from the port 151, and the state is realized that the stabilizer cylinders 21, the bucket cylinder 29 and the boom cylinder 25 are not operated at all (hereinafter, the state is simply referred to as "wrong operation state"). When the backhoe 4 is operated at the wrong operation state, the backhoe 4 may act against operator's will. The action against the operator's will may cause defects such as instability of posture of the working vehicle 1.

According to the interlock mechanism 400, the mode switching valve 230 can be switched to the confluence position K only in the case that the PTO switching valve 240 is at the continuous position P, whereby the pressure oil combined in the mode switching valve 230 is prevented from being supplied to the backhoe control valve 150. Accordingly, the wrong operation state as mentioned above can be prevented so as to improve the safety of the working vehicle 1.

Figure 4:
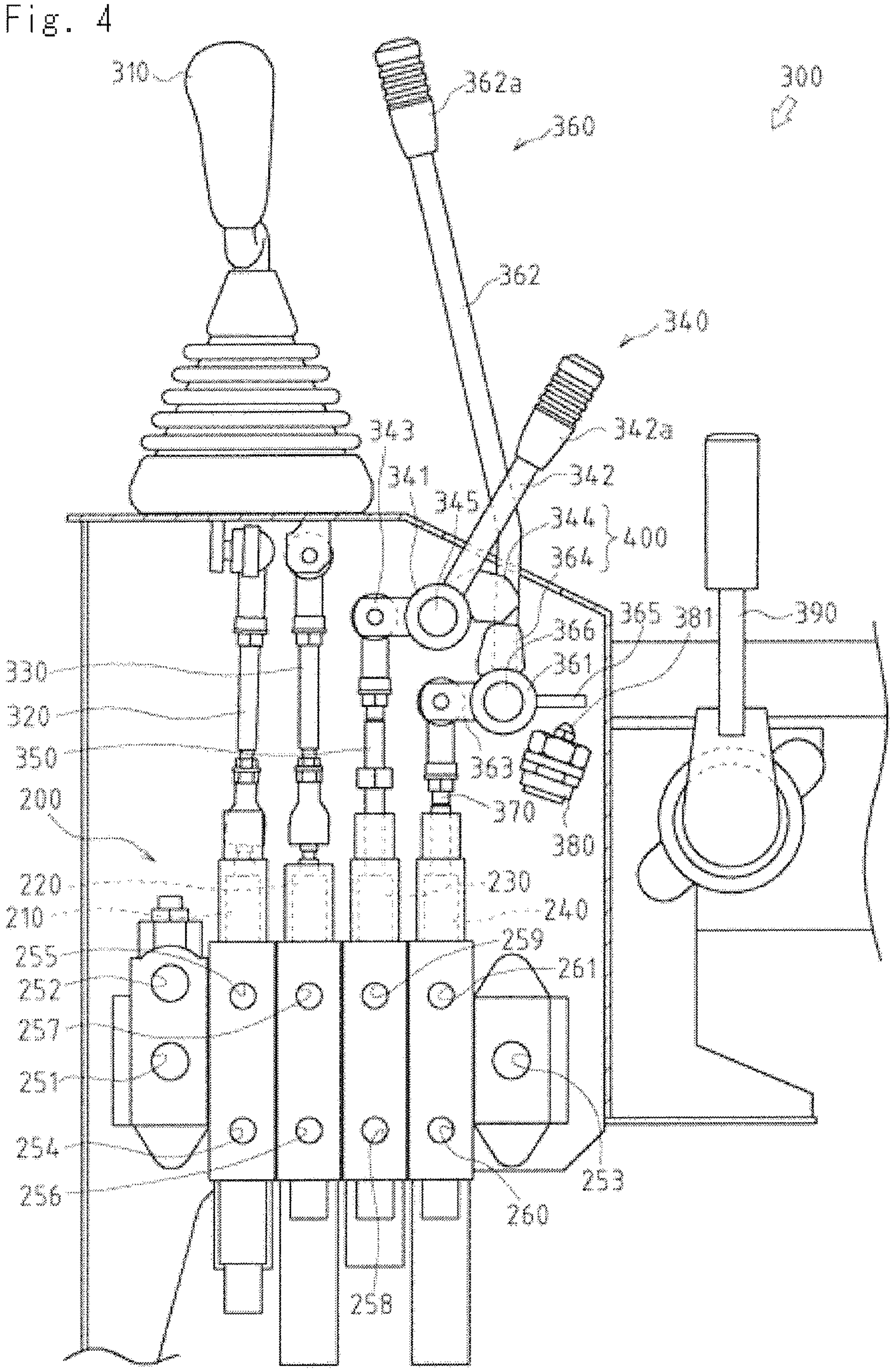
[FIG. 4] It is a left side view of a loader operation device.

Explanation will be given on the construction of the loader operation device 300 in detail referring to FIG. 4. For convenience of the explanation, in FIG. 4, the pipes 136, 262, 263, 264, 265, 266, 267 and 268 are not shown.

The loader operation device 300 mainly has the loader control valve 200, the loader operation lever 310, a dump link mechanism 320, a bucket link mechanism 330, the mode switching lever 340, a mode switching link mechanism 350, the PTO switching lever 360, a PTO link mechanism 370, a limit switch 380 and a throttle lever 390.

As mentioned above, the loader control valve 200 controls the action of the bucket lift cylinders 17, the dump cylinders 18 and the like. The loader control valve 200 is provided at the right side of the seat 12. The loader control valve 200 mainly has the dump cylinder switching valve 210, the bucket lift cylinder switching valve 220, the mode switching valve 230 and the PTO switching valve 240.

The loader operation lever 310 switches the positions of the dump cylinder switching valve 210 and the bucket lift cylinder switching valve 220. The loader operation lever 310 is arranged above the loader control valve 200.

The dump link mechanism 320 connects the loader operation lever 310 to the dump cylinder switching valve 210.

By operating laterally the loader operation lever 310, the position of the dump cylinder switching valve 210 can be switched.

The bucket link mechanism 330 connects the loader operation lever 310 to the bucket lift cylinder switching valve 220.

By operating laterally the loader operation lever 310, the position of the bucket lift cylinder switching valve 220 can be switched.

The mode switching lever 340 switches the position of the mode switching valve 230. The mode switching lever 340 is arranged above the loader control valve 200 and behind the loader operation lever 310. The mode switching lever 340 mainly has a boss part 341, a grip part 342, an arm part 343 and a cam part 344.

The boss part 341 is substantially cylindrical. The boss part 341 is rotatably supported by a pivot shaft 345 whose axial direction is substantially the same as the lateral direction.

The grip part 342 is substantially cylindrical. One of ends of the grip part 342 is fixed to the outer peripheral surface of the boss part 341. The other end of the grip part 342 is extended rearward and upward. A grip 342*a* is provided at the other end of the grip part 342.

The arm part 343 is substantially rectangular plate-like. One of ends of the arm part 343 is fixed to the outer peripheral surface of the boss part 341. The other end of the arm part 343 is extended forward.

The cam part 344 is substantially plate-like. One of ends of the cam part 344 is fixed to the outer peripheral surface of the boss part 341. The other end of the cam part 344 is extended rearward, and the tip thereof is formed substantially triangularly.

The mode switching link mechanism 350 connects the other end of the arm part 343 to the mode switching valve 230.

At the time of switching the position of the mode switching valve 230, an operator grips the grip part 342 (the grip 342*a*) of the mode switching lever 340 and operates longitudinally the mode switching lever 340. By rotating the boss part 341 centering on the pivot shaft 345, the other end of the arm part

343 is rotated vertically. Accordingly, the position of the mode switching valve 230 is switched via the mode switching link mechanism 350.

The PTO switching lever 360 switches the position of the PTO switching valve 240. The PTO switching lever 360 is arranged above the loader control valve 200 and behind the loader operation lever 310. The PTO switching lever 360 mainly has a boss part 361, a grip part 362, an arm part 363, a cam part 364 and a touching part 365.

The boss part 361 is substantially cylindrical. The boss part 361 is rotatably supported by a pivot shaft 366 whose axial direction is substantially the same as the lateral direction. The boss part 361 is arranged below and behind the boss part 341 of the mode switching lever 340.

The grip part 362 is substantially cylindrical. One of ends of the grip part 362 is fixed to the outer peripheral surface of the boss part 361. The other end of the grip part 362 is extended upward. A grip 362*a* is provided at the other end of the grip part 362.

The arm part 363 is substantially rectangular plate-like. One of ends of the arm part 363 is fixed to the outer peripheral surface of the boss part 361. The other end of the arm part 363 is extended forward.

The cam part 364 is substantially plate-like. One of ends of the cam part 364 is fixed to the outer peripheral surface of the boss part 361. The other end of the cam part 364 is extended forward. The cam part 364 of the PTO switching lever 360 is arranged substantially the same plane position as the cam part 344 of the mode switching lever 340 in the lateral direction.

The touching part 365 is substantially plate-like. One of ends of the touching part 365 is fixed to the outer peripheral surface of the boss part 361. The other end of the touching part 365 is extended rearward.

The PTO link mechanism 370 connects the other end of the arm part 363 to the PTO switching valve 240.

At the time of switching the position of the PTO switching valve 240, an operator grips the grip part 362 (the grip 362*a*) of the PTO switching lever 360 and operates longitudinally the PTO switching lever 360. By rotating the boss part 361 centering on the pivot shaft 366, the other end of the arm part 363 is rotated vertically. Accordingly, the position of the PTO switching valve 240 is switched via the PTO link mechanism 370.

The limit switch 380 is an embodiment of a starting inhibition means according to the present invention, and is a switch whose contact point is engaged/disengaged corresponding to whether an operation chip 381 is pressed or not. The limit switch 380 is arranged below and behind the boss part 361 of the PTO switching lever 360 and below the touching part 365 of the PTO switching lever 360. In more detail, in the case that the PTO switching valve 240 is switched to the continuous position P, the limit switch 380 is arranged at the position at which the operation chip 381 of the limit switch 380 is pressed by the touching part 365 of the PTO switching lever 360.

When the operation chip 381 of the limit switch 380 is pressed, drive of a starter (not shown) starting the engine 6 is inhibited. Namely, when the operation chip 381 of the limit switch 380 is pressed, the engine 6 cannot be started.

The throttle lever 390 sets the rotational speed of the engine 6 of the working vehicle 1 (hereinafter, simply referred to as "engine rotational speed"). The throttle lever 390 is arranged behind the PTO switching lever 360. The throttle lever 390 is rotatable longitudinally centering on the lower end thereof By operating rotationally the throttle lever 390, the engine rotational speed can be set. Concretely, by rotating forward the throttle lever 390, the engine rotational speed can be increased. By rotating rearward the throttle lever 390, the engine rotational speed can be reduced.

The interlock mechanism 400 has the cam part 344 of the mode switching lever 340 and the cam part 364 of the PTO switching lever 360.

Explanation will be given on the action mode of the interlock mechanism 400 referring to FIGS. 5 to 9.

For convenience of the explanation, the position of the mode switching lever 340 in the case that the mode switching valve 230 is at the working position H is defined as a lever position Q, the position of the mode switching lever 340 in the case that the mode switching valve 230 is at the return position J is defined as a lever position R, and the position of the mode switching lever 340 in the case that the mode switching valve 230 is at the confluence position K is defined as a lever position S.

The positions of the PTO switching lever 360 in the case that the PTO switching valve 240 is at the positions L, M and N and the continuous position P are respectively defined as lever positions T, U, V and W.

In FIGS. 5 to 9, together with the reference letters of the lever positions, the reference letters of the positions of the mode switching valve 230 and the PTO switching valve 240 corresponding to the lever positions are shown in parentheses.

Figure 5:
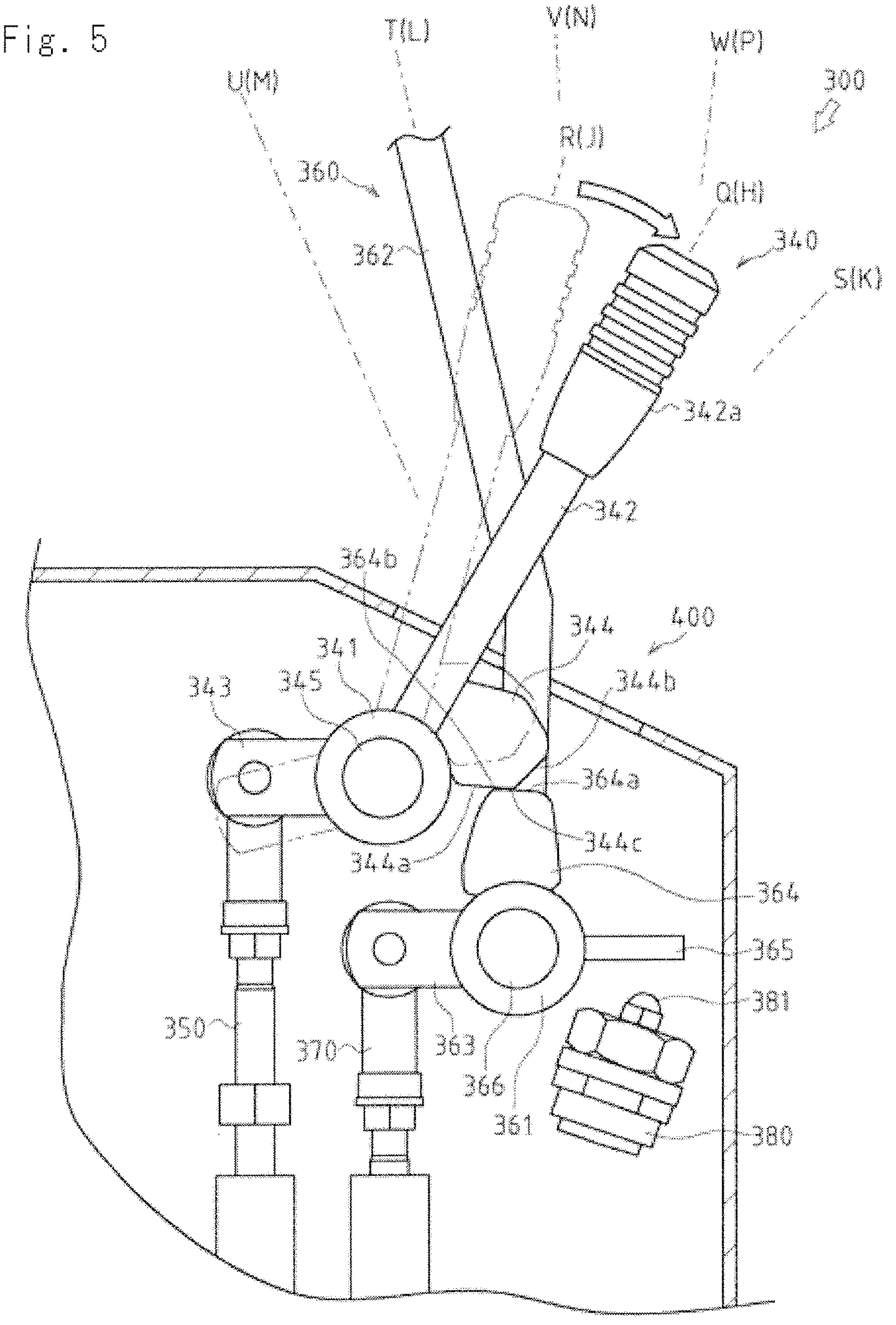
[FIG. 5] It is an enlarged left side view of the action mode of the loader operation device.

As shown in FIG. 5, in the case that the PTO switching lever 360 is at the lever position T, the mode switching lever 340 can be switched to the lever position Q or the lever position R. Namely, the other end of the cam part 364 of the PTO switching lever 360 is positioned in the rotational locus of the cam part 344 of the mode switching lever 340 while directing upward so as to restrict the rotational range of the mode switching lever 340, but is not within the rotational range of the mode switching lever 340 to be switched to the lever position Q or the lever position R and does not affect the rotation. In the case that the mode switching lever 340 is switched to the lever position Q, a lower surface 344*a* of the cam part 344 of the mode switching lever 340 touches an upper surface 364*a* of the cam part 364 of the PTO switching lever 360. Namely, the cam part 364 of the PTO switching lever 360 restricts the rotation of the mode switching lever 340 toward the lever position S. Accordingly, the mode switching lever 340 cannot be switched to the lever position S. Namely, the mode switching valve 230 cannot be switched to the confluence position K, whereby the pressure oil discharged from one of the discharge ports 132 and 133 is not combined.

Similarly to the above, in the case that the PTO switching lever 360 is switched to the lever position U or the lever position V, the rotation of the mode switching lever 340 toward the lever position S is also restricted. Accordingly, the mode switching lever 340 cannot be switched to the lever position S. Namely, the mode switching valve 230 cannot be switched to the confluence position K.

Figure 6:
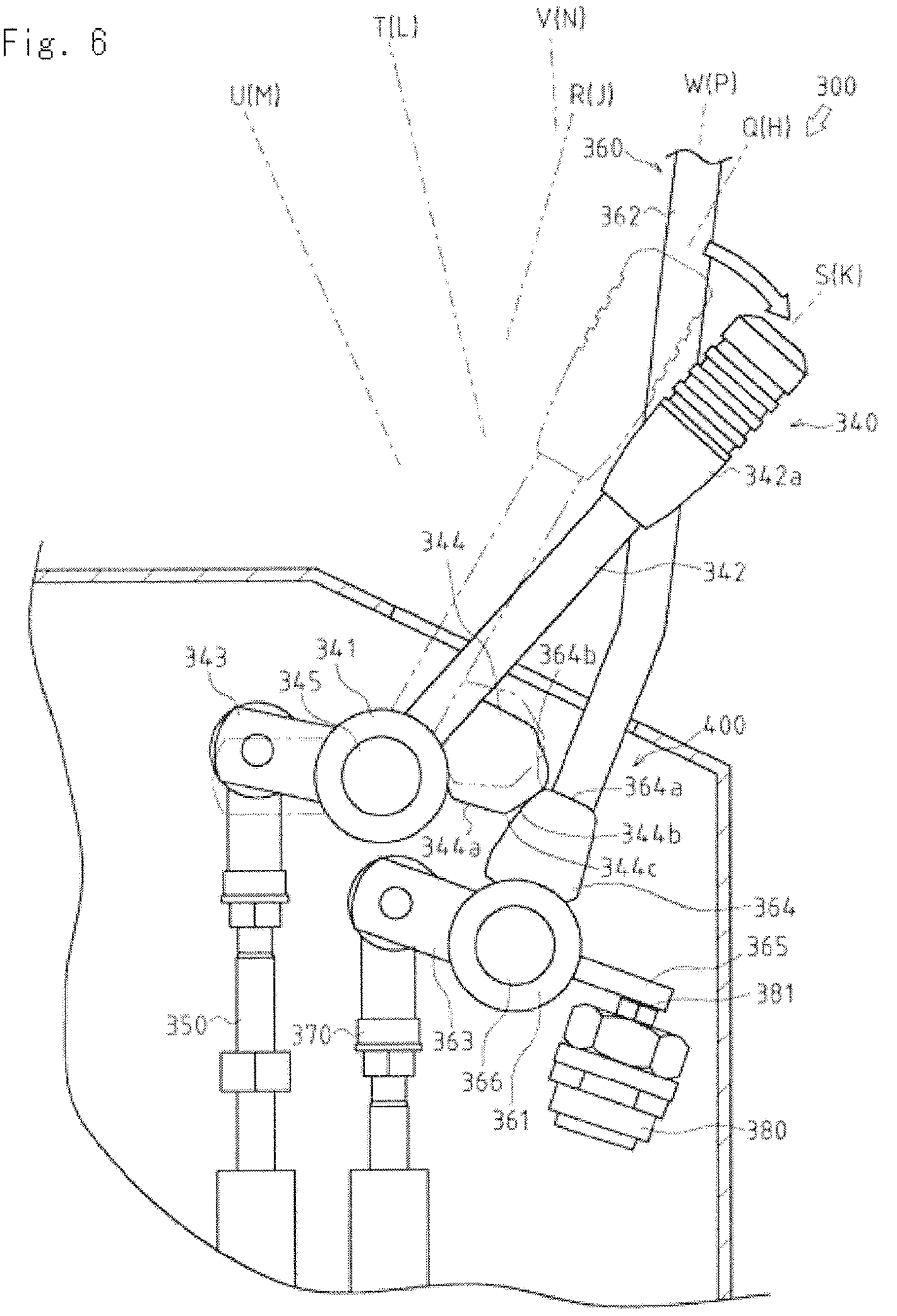
[FIG. 6] It is an enlarged left side view of the action mode of the loader operation device.

As shown in FIG. 6, in the case that the PTO switching lever 360 is switched to the lever position W, the operation chip 381 of the limit switch 380 is pressed by the touching part 365 of the PTO switching lever 360.

As mentioned above, the limit switch 380 is provided which inhibits the starting of the engine 6 in the case that the PTO switching valve 240 is switched to the continuous position P.

According to the construction, in the case that the PTO switching valve 240 is switched to the continuous position P, the engine 6 cannot be started. Namely, the working machine connected to the PTO ports 260 and 261 is prevented from being started driving simultaneously to the starting of the engine 6. Accordingly, at the time of maintenance of the working machine or the like, the working machine is prevented from being driven simultaneously to the starting of the engine 6, whereby the safety of maintenance work of the working machine and the like is improved.

In this embodiment, the starting inhibition means according to the present invention is constructed by the limit switch 380, but the present invention is not limited thereto. The starting inhibition means only must be constructed so as to detect that the PTO switching valve 240 is switched to the continuous position P and inhibit the starting of the engine 6.

In the case that the PTO switching lever 360 is switched to the lever position W, the lower surface 344*a* of the cam part 344 of the mode switching lever 340 does not touch the upper surface 364*a* of the cam part 364 of the PTO switching lever 360. Namely, the cam part 364 at the lever position W is not within the rotational range of the cam part 344 of the mode switching lever 340, and the restriction of the rotation of the mode switching lever 340 toward the lever position S by the cam part 364 of the PTO switching lever 360 is canceled. Accordingly, only in the case that the PTO switching lever 360 is switched to the lever position W, the mode switching lever 340 can be switched to the lever position S. Namely, the mode switching valve 230 can be switched to the confluence position K only in the case that the PTO switching valve 240 is at the continuous position P.

According to the construction, the pressure oil combined in the mode switching valve 230 is prevented from being pressingly sent to the port 151 of the backhoe control valve 150. Accordingly, the wrong operation state of the backhoe 4 can be prevented so as to improve the safety of the working vehicle 1.

Figure 7:
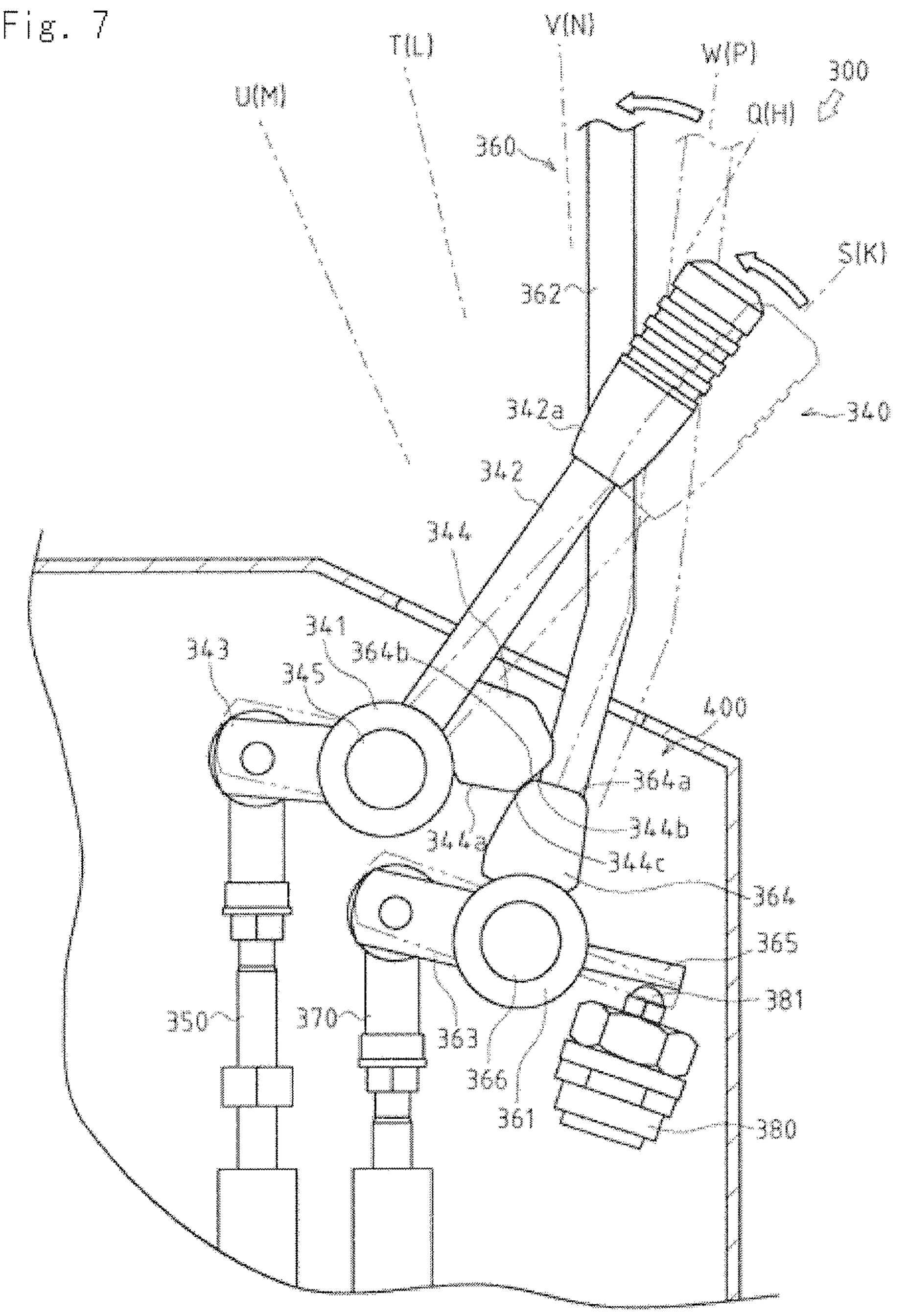
[FIG. 7] It is an enlarged left side view of the action mode of the loader operation device.

In the case that the PTO switching lever 360 is at the lever position W and the mode switching lever 340 is at the lever position S (FIG. 6), when the PTO switching lever 360 is switched to the lever position U, as shown in FIG. 7, a vertex 364*b* of the cam part 364 of the PTO switching lever 360 touches a lower rear surface 344*b* of the cam part 344 of the mode switching lever 340. When the PTO switching lever 360 is rotated toward the lever position U further from this state, the cam part 344 of the mode switching lever 340 is pressed by the cam part 364 of the PTO switching lever 360, whereby the mode switching lever 340 is rotated toward the lever position Q.

Figure 8:
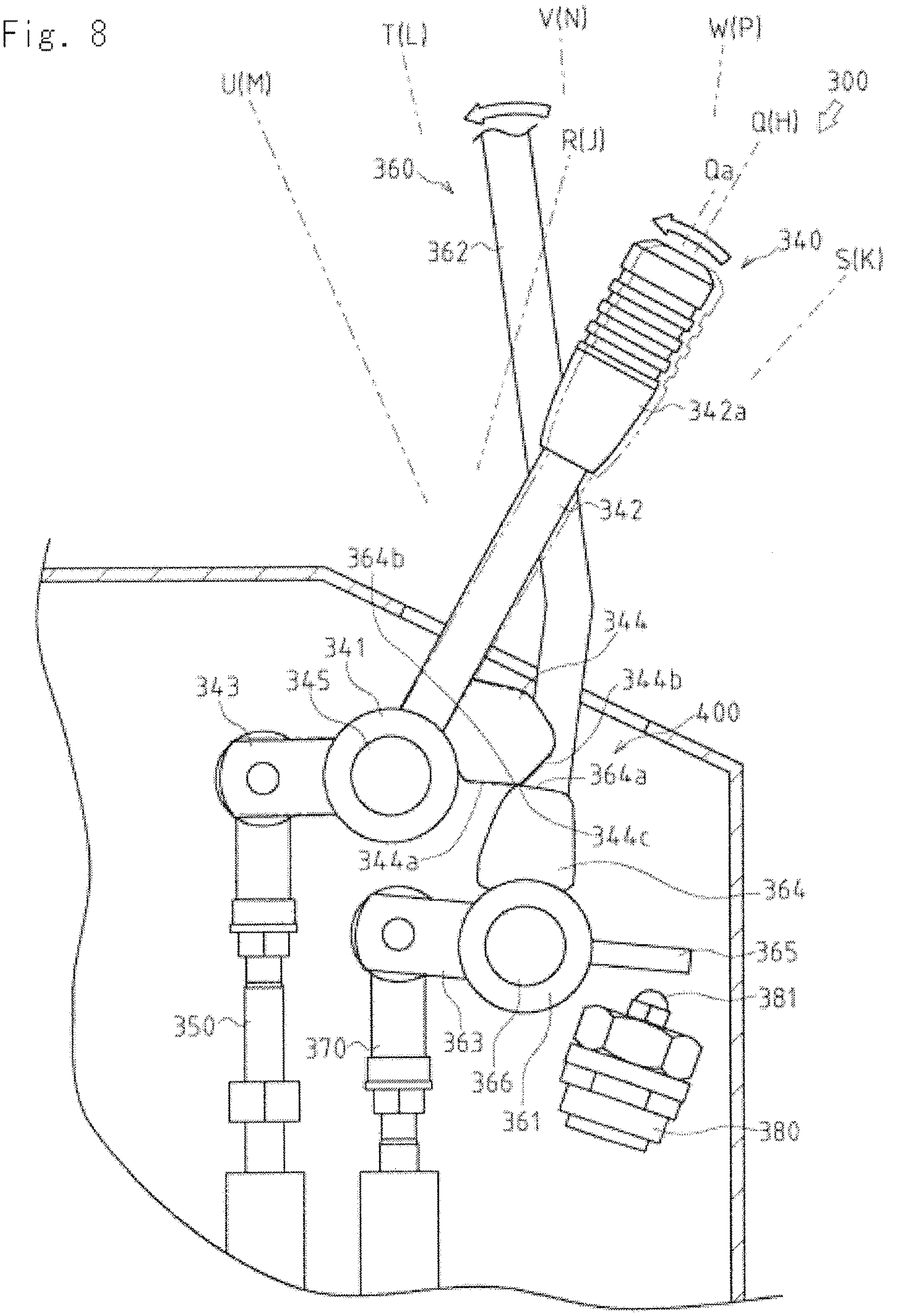
[FIG. 8] It is an enlarged left side view of the action mode of the loader operation device.

As shown in FIG. 8, in the middle of the rotation of the PTO switching lever 360 from the lever position W to the lever position U, the vertex 364*b* of the cam part 364 of the PTO switching lever 360 pushes the mode switching lever 340 toward the lever position Q while sliding on the lower rear surface 344*b* of the cam part 344 and touches a vertex 344*c* of the cam part 344 of the mode switching lever 340. In this case, the mode switching lever 340 is rotated to a position for predetermined angle toward the lever position R from the lever position Q (lever position Qa). Namely, the mode switching valve 230 is moved across the working position H toward the return position J for predetermined dimension.

Figure 9:
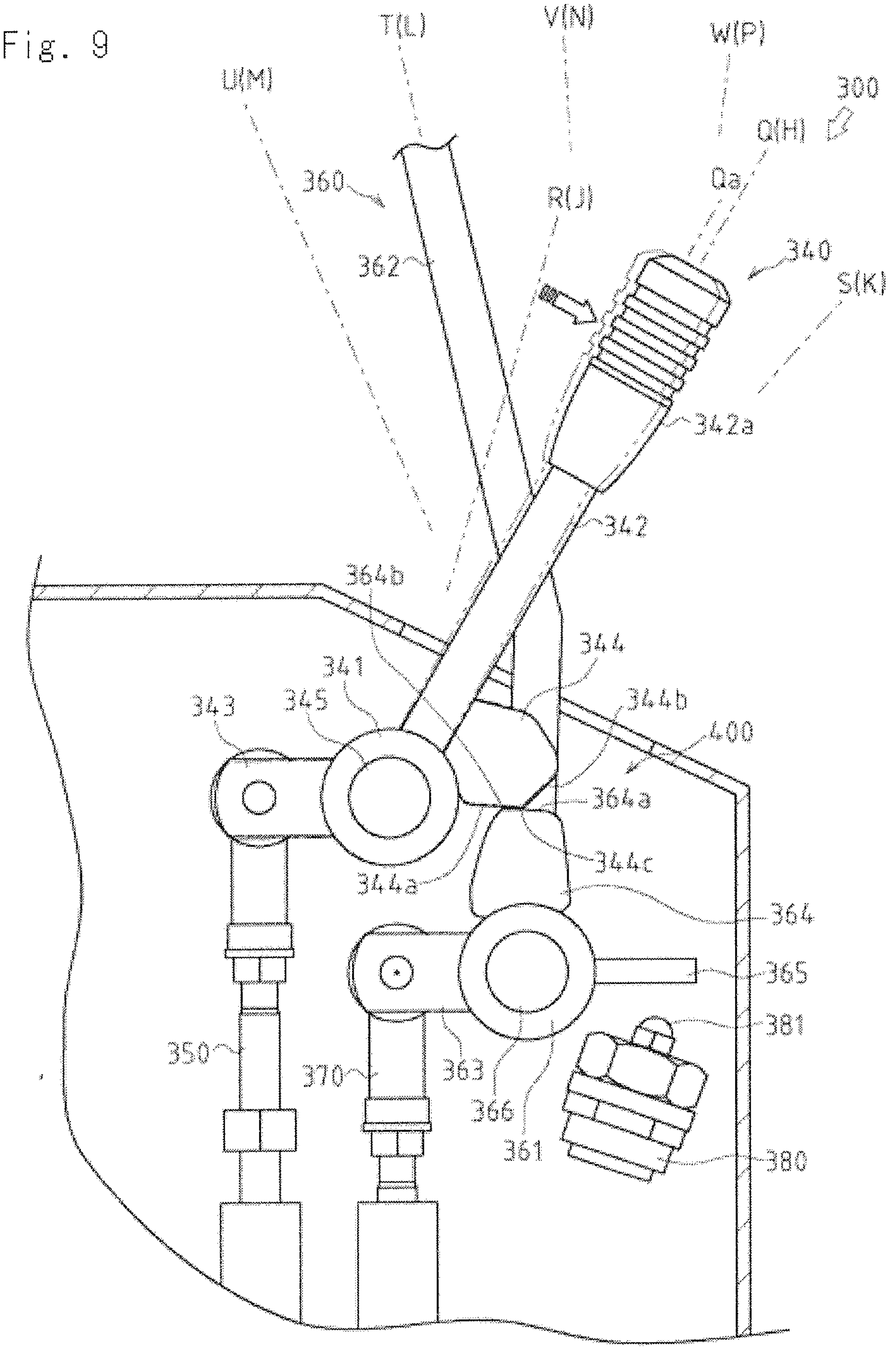
[FIG. 9] It is an enlarged left side view of the action mode of the loader operation device.

As shown in FIG. 9, when the PTO switching lever 360 is switched to the lever position T, the mode switching valve 230 is returned to the working position H and held at the position by the springs 231. Simultaneously, the mode switching lever 340 is returned to the lever position Q and held at the position.

According to the construction, in the case that the working machine connected to the PTO ports 260 and 261 is stopped, only by returning the PTO switching lever 360 from the lever position W to the lever position T, the mode switching lever 340 can be returned simultaneously from the lever position S to the lever position Q. Namely, by operating the PTO switching lever 360, the mode switching valve 230 can be switched to the working position H.

As mentioned above, in the interlock mechanism 400, when the PTO switching valve 240 is switched from the continuous position P to one of the other positions L, M and N, the mode switching valve 230 is switched from the confluence position K to one of the other positions (the working position H or the return position J).

According to the construction, the wrong operation state of the backhoe 4 can be prevented so as to improve the safety.

In the interlock mechanism 400, in the middle of switching of the PTO switching valve 240 from the continuous position P to one of the other positions L, M and N, the mode switching valve 230 is moved to the position across the position other than the confluence position K (the working position H or the return position J) for the predetermined dimension.

According to the construction, the mode switching valve 230 can be switched certainly to the working position H.

The predetermined angle and the predetermined dimension are set so that the mode switching valve 230 can be returned to the working position H by the springs 231.

As described later, the loader operation device 300 may alternatively has a throttle lever restriction mechanism 450 which is an embodiment of an engine rotational speed restriction means according to the present invention.

Figure 10:
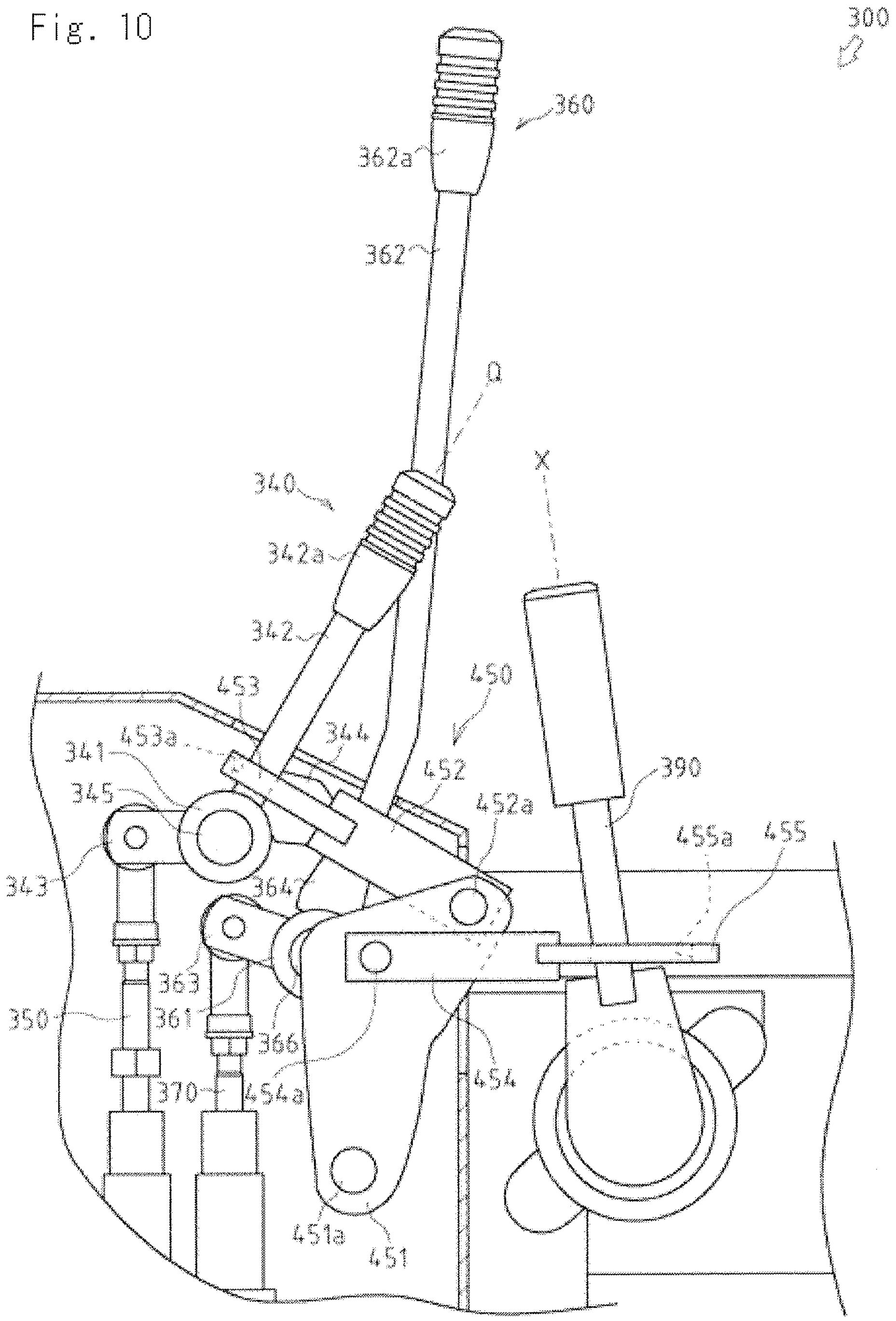
[FIG. 10] It is a left side view of an engine rotational speed restriction means.

As shown in FIG. 10, the throttle lever restriction mechanism 450 restricts the rotatable range of the throttle lever 390 based on the position of the mode switching lever 340. The throttle lever restriction mechanism 450 mainly has an intermediate link member 451, mode switching lever link members 452 and 453, and throttle lever link members 454 and 455.

The intermediate link member 451 is substantially triangular and plate-like. The lower end of the intermediate link member 451 is supported rotatably longitudinally by a pivot shaft 451*a*.

The mode switching lever link member 452 is substantially rectangular plate-like. One of ends of the mode switching lever link member 452 is supported rotatably vertically by a pivot shaft 452*a* at the upper end of the intermediate link member 451.

The mode switching lever link member 453 is substantially rectangular plate-like. One of ends of the mode switching lever link member 453 is fixed to the other end of the mode switching lever link member 452. A through hole 453*a* is formed at the other end of the mode switching lever link member 453 and penetrates it. The operator grips the grip part 342 of the mode switching lever 340 is inserted into the through hole 453*a*.

The throttle lever link member 454 is substantially rectangular plate-like. One of ends of the throttle lever link member 454 is supported rotatably vertically by a pivot shaft 454*a* at the vertical middle portion of the intermediate link member 451.

The throttle lever link member 455 is substantially rectangular plate-like. One of ends of the throttle lever link member 455 is fixed to the other end of the throttle lever link member 454. A through hole 455*a* is formed at the other end of the throttle lever link member 455 and penetrates it. The lengthwise direction of the through hole 455*a* is in agreement with the longitudinal direction. The throttle lever 390 is inserted into the through hole 455*a*.

Explanation will be given on the operation mode of the throttle lever restriction mechanism 450 constructed as the above.

In the case that the mode switching lever 340 is at one of the positions except the lever position S, the throttle lever 390 can be rotated longitudinally from the position at which the engine rotational speed is the minimum to the position at which the engine rotational speed is the maximum (hereinafter, simply referred to as "lever position X"). The through hole 455*a* of the throttle lever link member 455 is formed so as not to touch the throttle lever 390 when the throttle lever 390 is rotated in the case that the mode switching lever 340 is at one of the positions except the lever position S.

Figure 11:
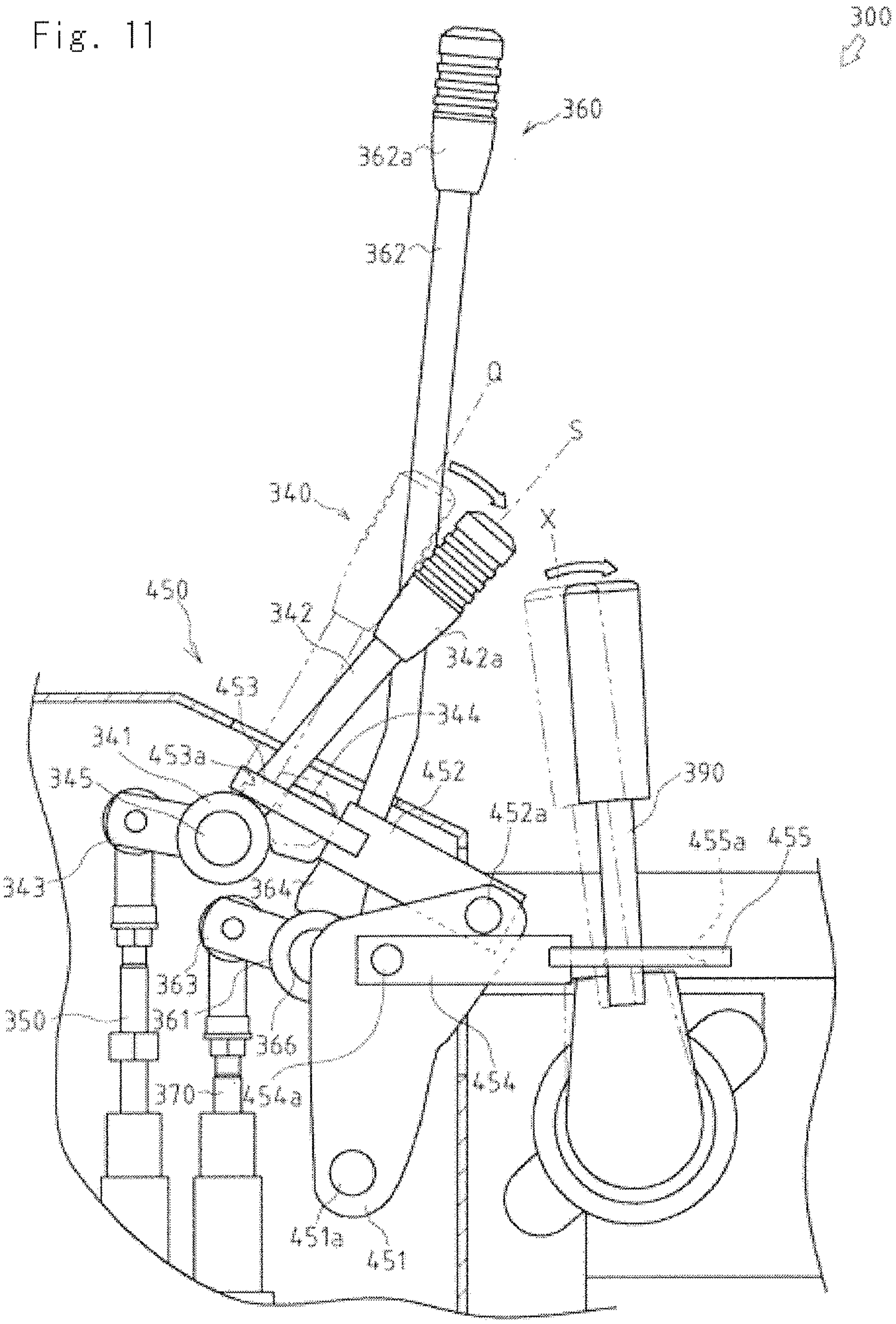
[FIG. 11] It is an enlarged left side view of the action mode of the engine rotational speed restriction means.

As shown in FIG. 11, when the mode switching lever 340 is switched to the lever position S, the mode switching lever link members 452 and 453 are moved rearward interlockingly with the rotation of the mode switching lever 340. By the movement of the mode switching lever link members 452 and 453, the upper end of the intermediate link member 451 is rotated rearward. By the rearward movement of the intermediate link member 451, the throttle lever link members 454 and 455 are moved rearward.

In this case, the through hole 455*a* of the throttle lever link member 455 is also moved rearward, whereby the forward rotation of the throttle lever 390 is restricted. Namely, in the case that the throttle lever 390 is at the lever position X, when the mode switching lever 340 is switched to the lever position S, the throttle lever 390 is rotated rearward for predetermined rotational angle by the throttle lever link member 455.

In this case, when the throttle lever 390 is rotated forward, the throttle lever 390 touches the inner peripheral front end of the through hole 455*a* of the throttle lever link member 455, whereby the throttle lever 390 cannot be rotated to the lever position X. Accordingly, the engine rotational speed is restricted not more than a predetermined value.

The predetermined value of the engine rotational speed is set previously for suppressing the temperature of pressure oil in the working vehicle 1 so as not to cause extraordinariness.

As mentioned above, the working vehicle 1 in this embodiment has the throttle lever restriction mechanism 450 which restricts the engine rotational speed not more than the predetermined rotational speed in the case that the mode switching valve 230 is switched to the confluence position K.

According to the construction, in the case that the mode switching lever 340 is at the lever position S, that is, the mode switching valve 230 is at the confluence position K, the rotation of the throttle lever 390 can be restricted so as to restrict the engine rotational speed not more than the predetermined value. Simultaneously, the discharge amount of pressure oil by the hydraulic pump provided in the hydraulic pump section 130 can be reduced. Accordingly, the rising of temperature of pressure oil in the case that the mode switching valve 230 is switched to the confluence position K is suppressed, whereby extraordinariness such as overheating can be prevented.

As mentioned above, the through hole 455*a* formed in the throttle lever link member 455 is formed so as to restrict the rotation of the throttle lever 390, that is, restrict the engine rotational speed not more than the predetermined value in the case that the mode switching lever 340 is at the lever position S.

As another embodiment of the engine rotational speed restriction means according to the present invention, a throttle lever restriction mechanism 460 described below may alternatively be provided.

Figure 12:
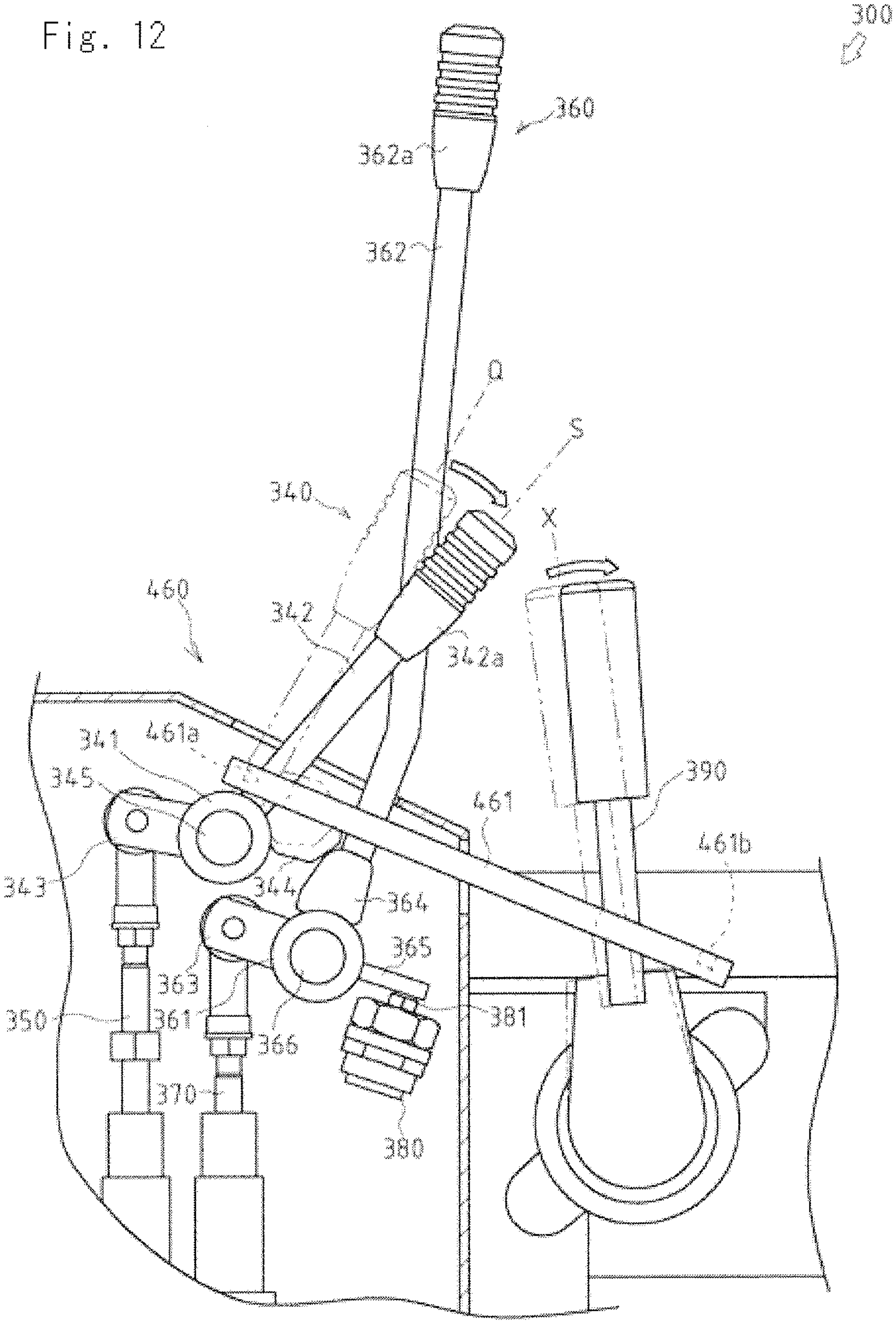
[FIG. 12] It is a left side view of another embodiment of the engine rotational speed restriction means.

As shown in FIG. 12, the throttle lever restriction mechanism 460 has a link member 461. The link member 461 is plate-like.

A through hole 461*a* is formed in one of ends of the link member 461 and penetrates it. The operator grips the grip part 342 of the mode switching lever 340 is inserted into the through hole 461*a*.

A through hole 461*b* is formed in the other end of the link member 461 and penetrates it. The lengthwise direction of the through hole 461*b* is in agreement with the longitudinal direction. The throttle lever 390 is inserted into the through hole 461*b*.

Explanation will be given on the operation mode of the throttle lever restriction mechanism 460 constructed as the above.

In the case that the mode switching lever 340 is at one of the positions except the lever position S, the throttle lever 390 can be rotated longitudinally from the position at which the engine rotational speed is the minimum to the position at which the engine rotational speed is the maximum (lever position X). The dimension of the through hole 461*b* of the link member 461 is formed so as not to touch the throttle lever 390 when the throttle lever 390 is rotated in the case that the mode switching lever 340 is at one of the positions except the lever position S.

When the mode switching lever 340 is switched to the lever position S, the link member 461 is moved rearward interlockingkly with the rotation of the mode switching lever 340. In this case, the through hole 461*b* of the link member 461 is also moved rearward, whereby the forward rotation of the throttle lever 390 is restricted. Namely, in the case that the throttle lever 390 is at the lever position X, when the mode switching lever 340 is switched to the lever position S, the throttle lever 390 is rotated rearward for predetermined rotational angle by the link member 461.

In this case, when the throttle lever 390 is rotated forward, the throttle lever 390 touches the inner peripheral front end of the through hole 461*b* of the link member 461, whereby the throttle lever 390 cannot be rotated to the lever position X. Accordingly, the engine rotational speed is restricted not more than a predetermined value.

As another embodiment of the engine rotational speed restriction means according to the present invention, a throttle lever restriction mechanism 470 described below may alternatively be provided.

Figure 13:
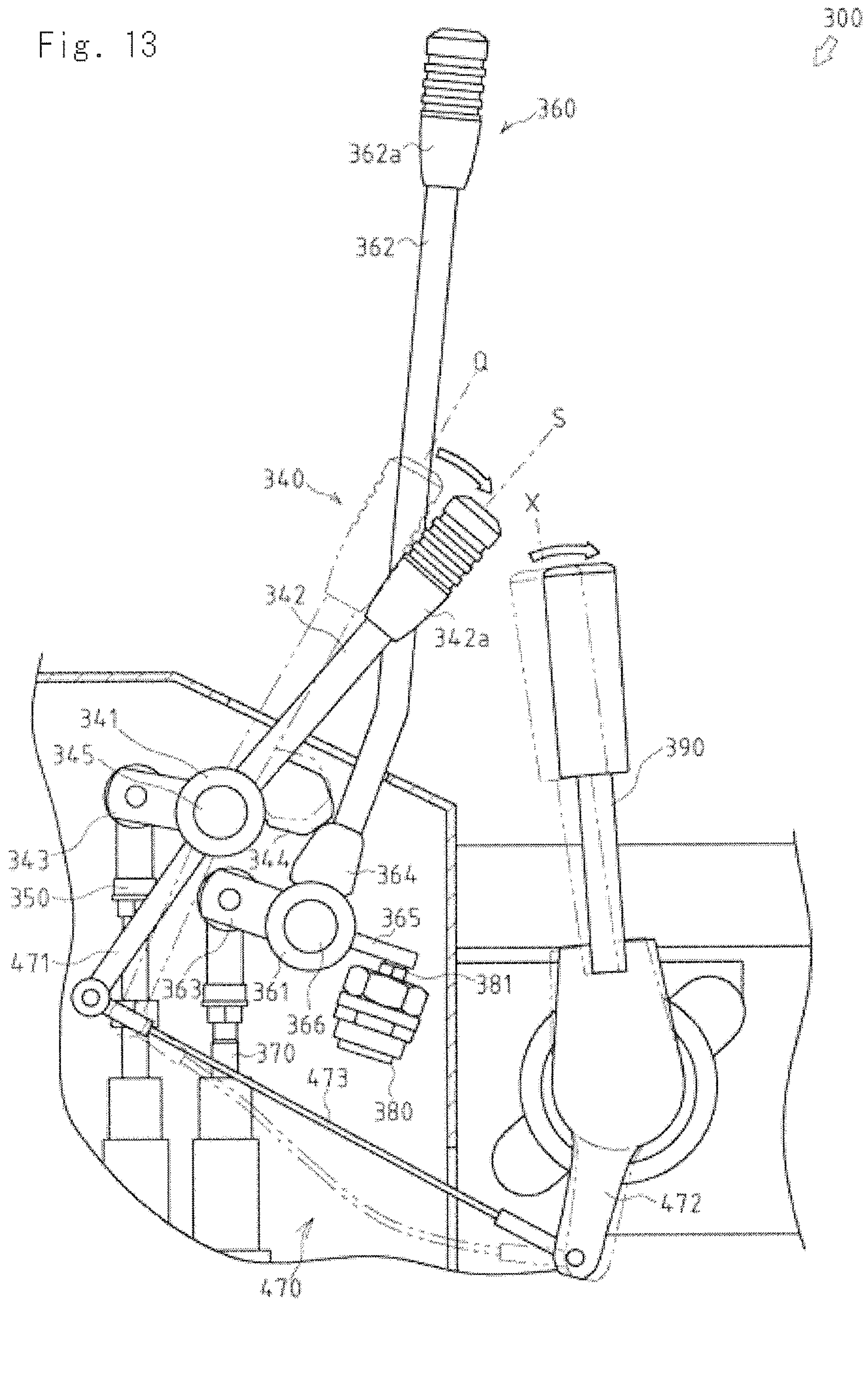
[FIG. 13] It is a left side view of another embodiment of the engine rotational speed restriction means.

As shown in FIG. 13, the throttle lever restriction mechanism 470 has a mode switching lever arm 471, a throttle lever arm 472, a cable 473 and the like.

The mode switching lever arm 471 is substantially cylindrical. One of ends of the mode switching lever arm 471 is fixed to the outer peripheral surface of the boss part 341. The other end of the mode switching lever arm 471 is extended downward.

The throttle lever arm 472 is substantially cylindrical. One of ends of the throttle lever arm 472 is fixed to the lower end of the throttle lever 390. The other end of the throttle lever arm 472 is extended downward.

The cable 473 is string-like and connects the mode switching lever arm 471 to the throttle lever arm 472. One of ends of the cable 473 is connected to the other end of the mode switching lever arm 471. The other end of the cable 473 is connected to the other end of the throttle lever arm 472.

Explanation will be given on the operation mode of the throttle lever restriction mechanism 460 constructed as the above.

In the case that the mode switching lever 340 is at one of the positions except the lever position S, the throttle lever 390 can be rotated longitudinally from the position at which the engine rotational speed is the minimum to the position at which the engine rotational speed is the maximum (lever position X). The dimension (length) of the cable 473 is formed so as not to restrict the rotation of the throttle lever 390 when the throttle lever 390 is rotated in the case that the mode switching lever 340 is at one of the positions except the lever position S.

When the mode switching lever 340 is switched to the lever position S, the mode switching lever arm 471 is rotated interlockingkly with the rotation of the mode switching lever 340. By rotating the mode switching lever arm 471, the other end of the throttle lever arm 472 is pulled forward via the cable 473. Namely, in the case that the throttle lever 390 is at the lever position X, when the mode switching lever 340 is switched to the lever position S, the throttle lever 390 is rotated rearward for predetermined rotational angle by the cable 473.

In this case, when the throttle lever 390 is rotated forward, the rotation of the throttle lever arm 472 is restricted by the cable 473, whereby the throttle lever 390 cannot be rotated to the lever position X. Accordingly, the engine rotational speed is restricted not more than a predetermined value.

The engine rotational speed restriction means according to the present invention is not limited to the construction such as the throttle lever restriction mechanisms 450, 460 and 470. Namely, it only must be constructed so that the engine rotational speed can be restricted not more than a predetermined value when the mode switching lever 340 is switched to the lever position S.

Industrial Applicability

The present invention can be employed for an art of a working vehicle having two or more hydraulic pumps.

The invention claimed is:

1. A working vehicle comprising:

two or more hydraulic pumps independent of each other and pressingly sending pressure oil;

a mode switching valve which can be switched to a confluence position at which the pressure oil pressingly sent by the two or more hydraulic pumps is combined;

a power take off (PTO) port at which the pressure oil is extracted; and a PTO switching valve arranged downstream the mode switching valve and switched so as to send pressingly the pressure oil to the PTO port;

characterized in that the mode switching valve can be switched among the confluence position, a return position at which the pressure oil pressingly sent by the two hydraulic pumps is returned to a tank, and a working position at which the pressure oil pressingly sent by said two or more hydraulic pumps, is pressingly sent to the other control valves respectively arranged at the downstream sides without combining the pressure oil.

2. The working vehicle according to claim 1, wherein the PTO switching valve has:

a continuous position at which pressure oil is held to be able to be sent pressingly to the PTO port, and an interlock mechanism which makes the mode switching valve able to be switched to the confluence position only in the case that the PTO switching valve is switched to the continuous position.

3. The working vehicle according to claim 2, wherein the interlock mechanism is constructed so that, when the PTO switching valve is switched from the continuous position to the other position, the mode switching valve is switched from the confluence position to the other position.

4. The working vehicle according to claim 3, wherein the interlock mechanism is constructed so that, in the middle of switching of the PTO switching valve from the continuous position to the other position, the mode switching valve is moved to a position across the position other than the confluence position for a predetermined dimension.

5. The working vehicle according to claim 2, further comprising a starting inhibition means which inhibits starting of an engine in the case that the PTO switching valve is switched to the continuous position.

6. The working vehicle according to claim 1, further comprising an engine rotational speed restriction means which restricts the rotational speed of the engine not more than a predetermined rotational speed in the case that the mode switching valve is switched to the confluence position.

7. The working vehicle according to claim 2, further comprising an engine rotational speed restriction means which restricts the rotational speed of the engine not more than a predetermined rotational speed in the case that the mode switching valve is switched to the confluence position.

8. The working vehicle according to claim 3, further comprising an engine rotational speed restriction means which restricts the rotational speed of the engine not more than a predetermined rotational speed in the case that the mode switching valve is switched to the confluence position.

9. The working vehicle according to claim 4, further comprising an engine rotational speed restriction means which restricts the rotational speed of the engine not more than a predetermined rotational speed in the case that the mode switching valve is switched to the confluence position.

10. The working vehicle according to claim 5, further comprising an engine rotational speed restriction means which restricts the rotational speed of the engine not more than a predetermined rotational speed in the case that the mode switching valve is switched to the confluence position.

* * * * *

UNITED STATES PATENT AND TRADEMARK OFFICE

CERTIFICATE OF CORRECTION

PATENT NO. : 8,713,931 B2
APPLICATION NO. : 13/061678
DATED : May 6, 2014
INVENTOR(S) : Kunihiko Sakamoto et al.

It is certified that error appears in the above-identified patent and that said Letters Patent is hereby corrected as shown below:

In the Claims

At column 21, line 51 (claim 1), “hydraulic pumps, is pressingly” should be --hydraulic pumps is pressingly--.

At column 21, line 51 – column 22, line 1 (claim 1), “sent to the other” should be --sent to other--.

Signed and Sealed this
Second Day of September, 2014

Michelle K. Lee
*Deputy Director of the United States Patent and Trademark Office*